United States Patent [19]
Bailey et al.

[11] Patent Number: 5,909,180
[45] Date of Patent: Jun. 1, 1999

[54] ELECTRICAL DISTRIBUTION SYSTEM WITH INFORMATIONAL DISPLAY

[75] Inventors: Curtis J. Bailey, Birmingham, Mich.; Ronald J. Bilas, Cedar Rapids, Iowa; Ronald L. Farrington, Cedar Rapids, Iowa; Dennis W. Fleege, Cedar Rapids, Iowa; Drew A. Reid, Cedar Rapids, Iowa

[73] Assignee: Square D Company, Palatine, Ill.

[21] Appl. No.: 07/723,474

[22] Filed: Jun. 28, 1991

[51] Int. Cl.⁶ .................................................. G08B 21/00
[52] U.S. Cl. ............................................. 340/639; 340/638
[58] Field of Search ..................... 340/638, 639, 340/825.06, 825.16, 825.17, 825.18, 524, 525; 335/17; 364/483; 324/424; 361/93, 94, 95, 96, 97

[56] References Cited

U.S. PATENT DOCUMENTS

| | | |
|---|---|---|
| 3,529,292 | 9/1970 | Neill et al. .......................... 340/638 X |
| 4,556,882 | 12/1985 | Brifman et al. ..................... 340/638 X |
| 4,754,162 | 6/1988 | Kondou et al. ........................ 361/97 X |
| 4,977,513 | 12/1990 | LaPalme ............................ 340/638 X |
| 5,051,861 | 9/1991 | Purkayastha et al. .................... 361/96 |

*Primary Examiner*—Jeffery A. Hofsass
*Attorney, Agent, or Firm*—Larry I. Golden; Kareem M. Irfan

[57] ABSTRACT

For use within an electrical distribution to control current paths through a plurality of associated circuit breakers, a circuit arrangement comprises a plurality of circuit breakers, each having a status related to open contact position and a closed contact position. An informational display is included within the load-center to display the plurality of statuses at a user access side of the display, and a control circuit, coupled to the circuit breakers and the informational display, automatically monitors the contact status of the circuit breakers and drives the informational display so that a display of the statuses is provided.

2 Claims, 29 Drawing Sheets

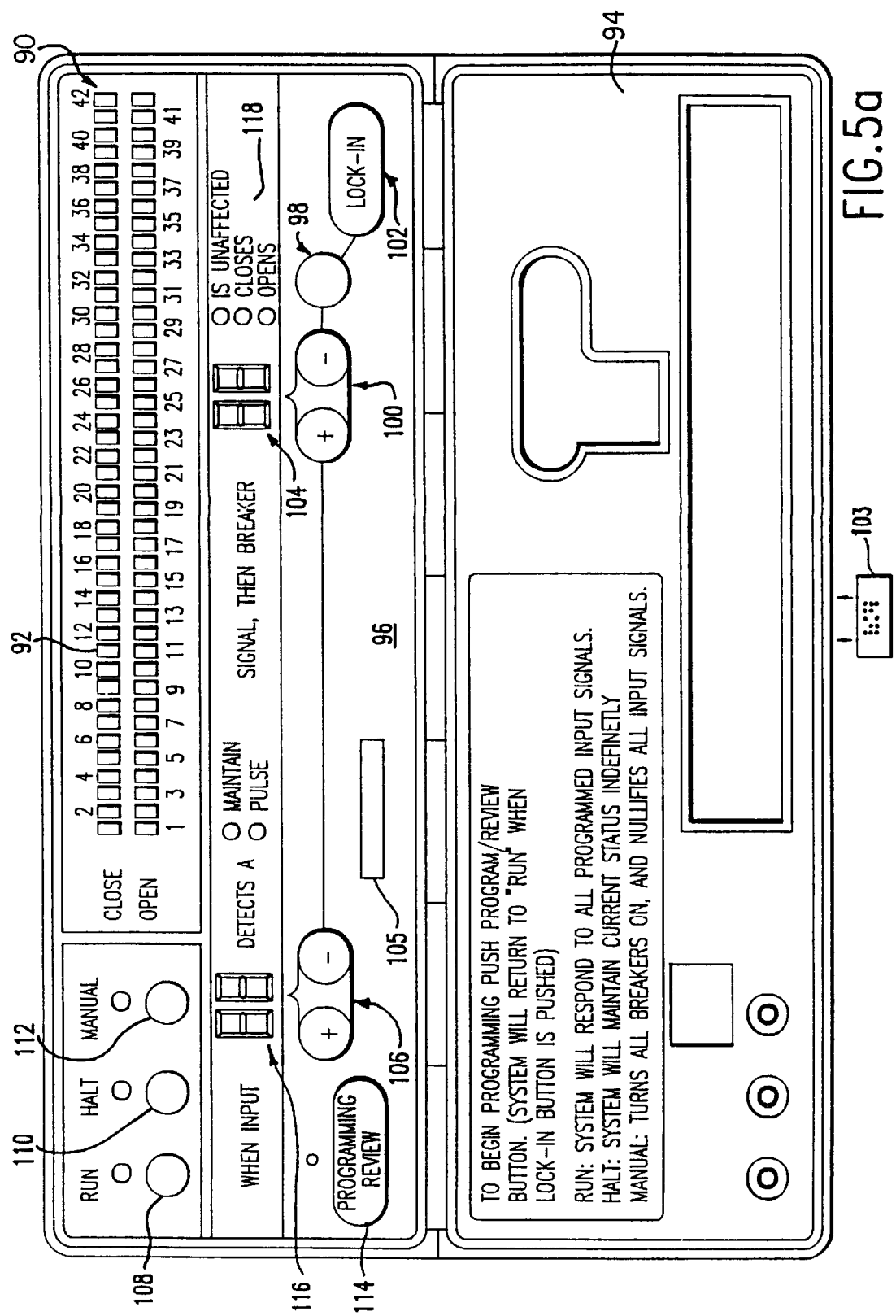

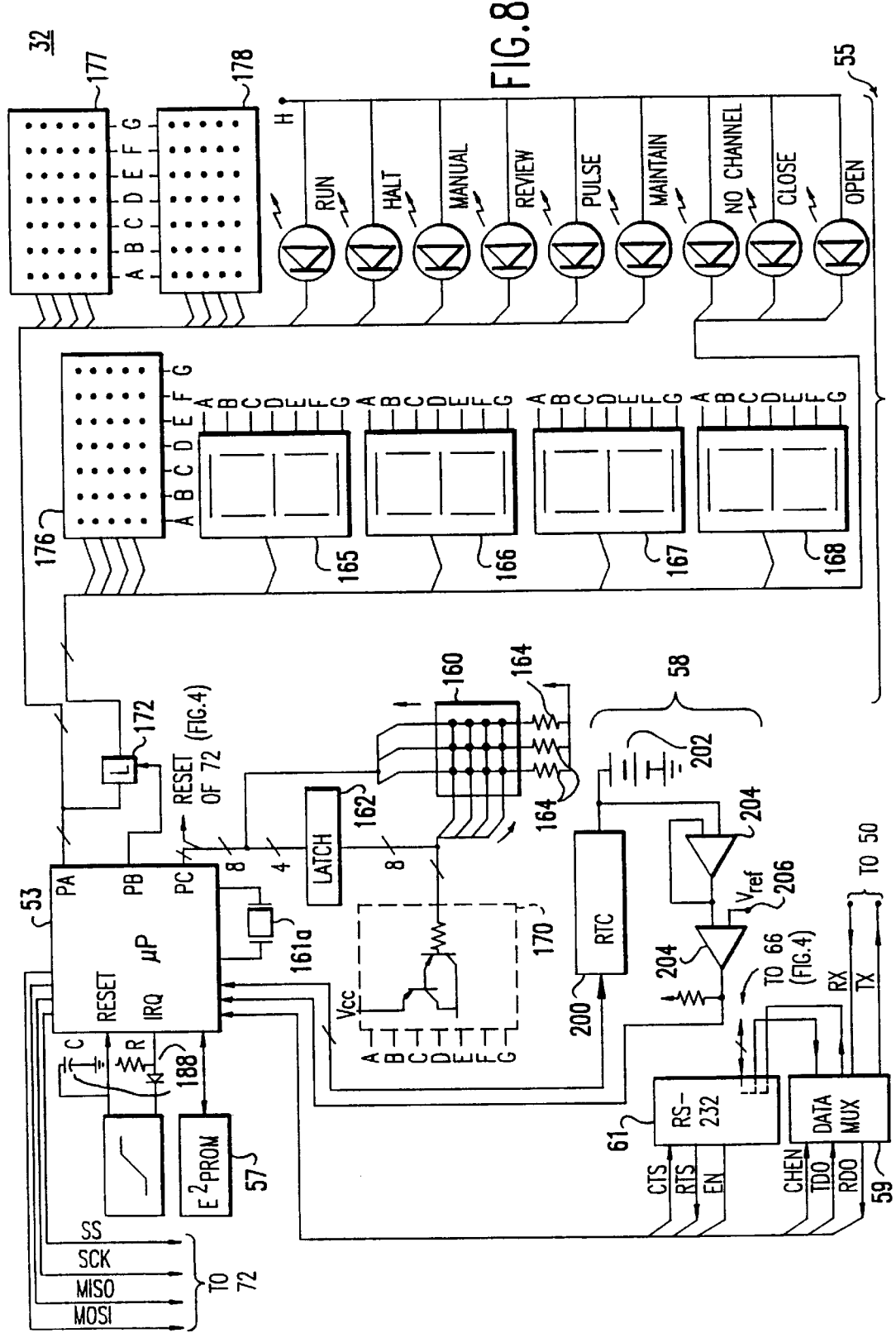

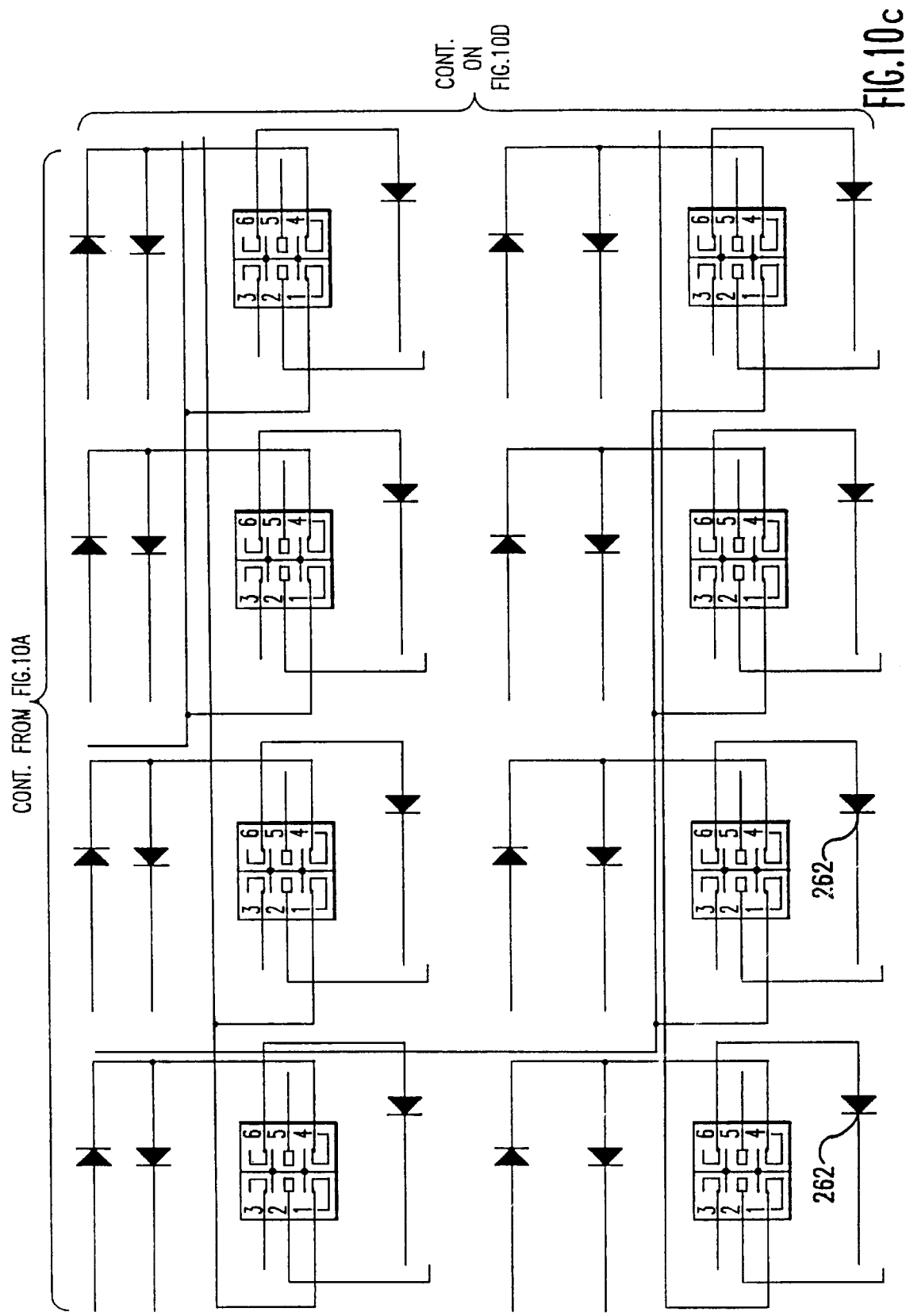

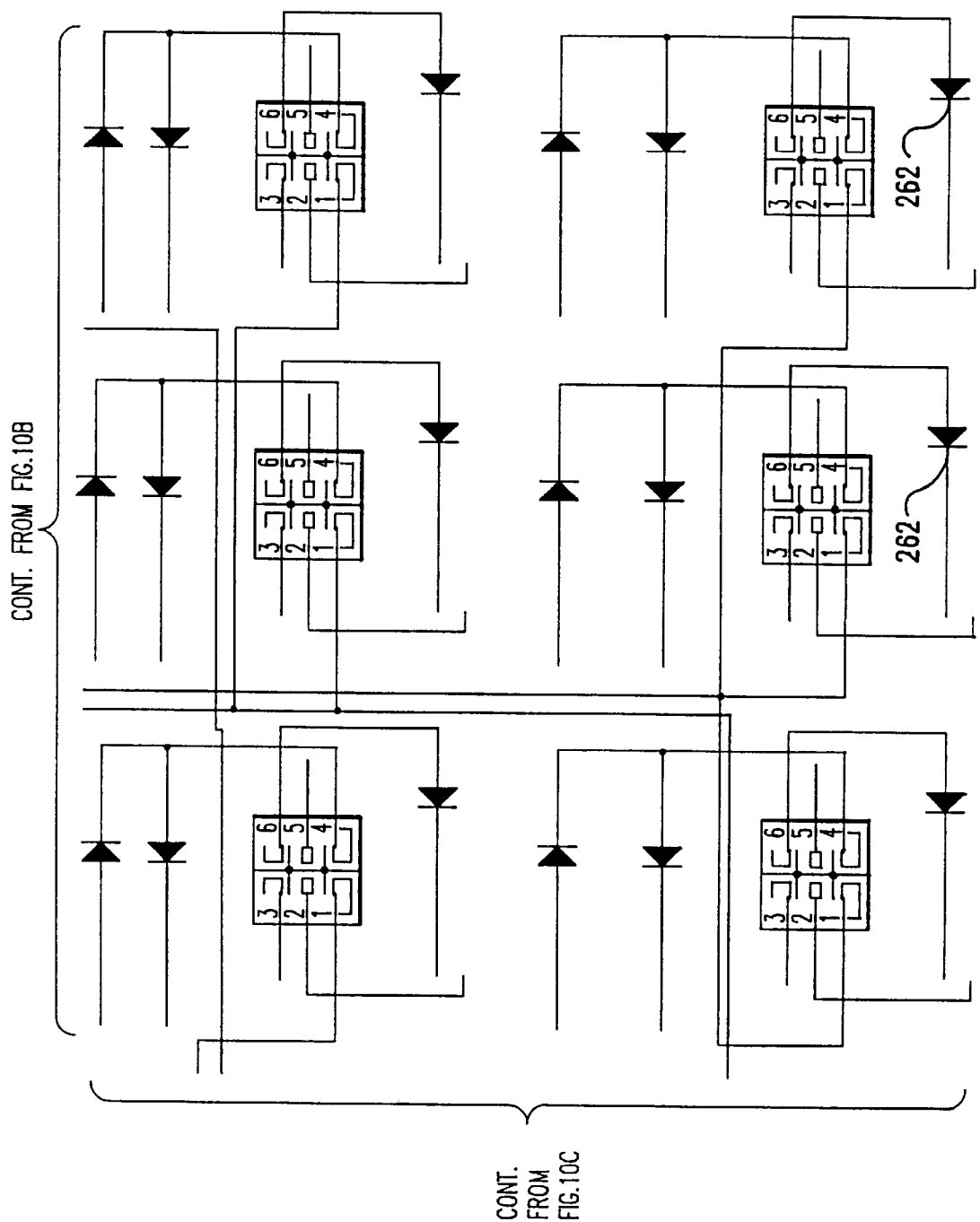

ELECTRICAL DISTRIBUTION SYSTEM WITH INFORMATIONAL DISPLAY

FIELD OF THE INVENTION

The present invention relates generally to circuit breaker load centers and, more particularly, to improvements in the control and monitoring of remotely controlled circuit breakers.

BACKGROUND OF THE INVENTION

Remote control circuit breakers are commonly used for temporary interruption of electrical service during peak use hours and for programmable lighting control of industrial locations. By opening and closing on demand from a remote location, these circuit breakers provide a significant improvement over manually operated circuit breakers in terms of convenience.

Systems using remote control circuit breakers typically include a circuit breaker load-center having circuit breakers wired to a remotely located computer for monitoring and/or controlling each circuit breaker. The wiring has been accomplished in such systems either by using a patch-board within the load-center, as described in U.S. Pat. No. 4,920,476 (Brodsky et al.), or by hard-wiring each circuit breaker input/output to a terminal in the remotely located computer.

Such systems, unfortunately, are not very accommodating to system control changes. Rather, the systems are designed to handle specific types of remote control signals, typically provided by a pair of wires that may be shorted to command the circuit breaker to close. Each time the circuit breaker control requirements change in these systems, the wiring and many system components must be reconfigured or replaced, thereby making these systems expensive and burdensome to maintain.

Another maintenance-related problem with these types of systems concerns the ability to control and monitor the system. Most load-center systems fail to provide a conveniently arranged monitoring system for the various circuit breakers and/or fail to provide a convenient method of on-line circuit breaker programming.

There is therefore a need for a remotely controlled circuit breaker load-center which is easier and more convenient to monitor and operate.

OBJECTS AND SUMMARY OF THE INVENTION

It is a general object of the present invention to provide an improved remote control circuit breaker arrangement which overcomes the aforementioned deficiencies of the prior art and which is more convenient to monitor and operate locally and remotely.

It is another object of this invention to provide an improved circuit breaker arrangement having a programming feature that is easier and simpler to operate.

In accordance with one preferred embodiment of the present invention, the present invention provides a circuit arrangement for use within a load-center used to control current paths through a plurality of associated circuit breakers. The circuit arrangement includes a plurality of circuit breakers, each having a status related to an open contact position and a closed contact position. An informational display is included within the load-center to display the plurality of statuses at a user access side of the display, and a control circuit, coupled to the circuit breakers and the informational display, automatically monitors the contact status of the circuit breakers and drives the informational display so that a display of the statuses is provided.

According to another preferred embodiment, the present invention provides a load-center arrangement for controlling a plurality of circuit breakers, each of which operates in at least an open and a closed circuit position and each having a plurality of statuses including an open contact status and a closed contact status. The arrangement is in a load-center housing and includes a circuit breaker engagement circuit, respectively coupled to the circuit breakers and responsive to at least one of a plurality of remote control signals, for controlling the circuit breakers such that at least one circuit breaker is able to open and close in response thereto. Further, a user-operable programmable control/display circuit is integrally contained within the load-center housing and situated to generate signals to control the engagement circuit so that at least one circuit breaker is properly controlled between the open and closed circuit positions, and is arranged to display the plurality of statuses at a user access side of the display. A control circuit, coupled to the circuit breakers and the user-operable programmable control/display circuit, automatically monitors the contact statuses of circuit breakers and drives the user-operable programmable control/display circuit so that a display of the statuses is provided.

BRIEF DESCRIPTION OF THE DRAWINGS

Other objects and advantages of the invention will be apparent from the following detailed description and the accompanying drawings in which:

FIG. 1b is another perspective view of the load center arrangement of FIG. 1a;

FIG. 3 is an end view, taken along line 3—3 of FIG. 1a, illustrating various interconnected components of the system of FIG. 1a;

FIG. 5a is a perspective view of the display for the controller shown in FIGS. 1–4;

FIG. 6 is a block diagram of an expansion module, according to the present invention, which may be used to interconnect a various types of accessories into the system of FIG. 1a;

FIG. 8 is a schematic diagram of the controller shown in FIGS. 1–4;

FIG. 9d is a schematic diagram of the electrical portion of a circuit breaker illustrated in FIG. 1a;

FIGS. 9e–9g comprise three state diagrams which depict the power driver, data transmit and data receive operation of the gate array illustrated in FIG. 9a;

FIGS. 9h–9k comprise a series of timing diagrams which respectively depict the receive message, open contacts, read status and read motor operations of the gate array illustrated in FIG. 9a;

FIGS. 10a–10d is a schematic diagram of a control bus shown in FIG. 2;

FIGS. 13a–13d comprise a flow chart which may be used to program the microcomputer shown in FIG. 11a.

Figure 1A:
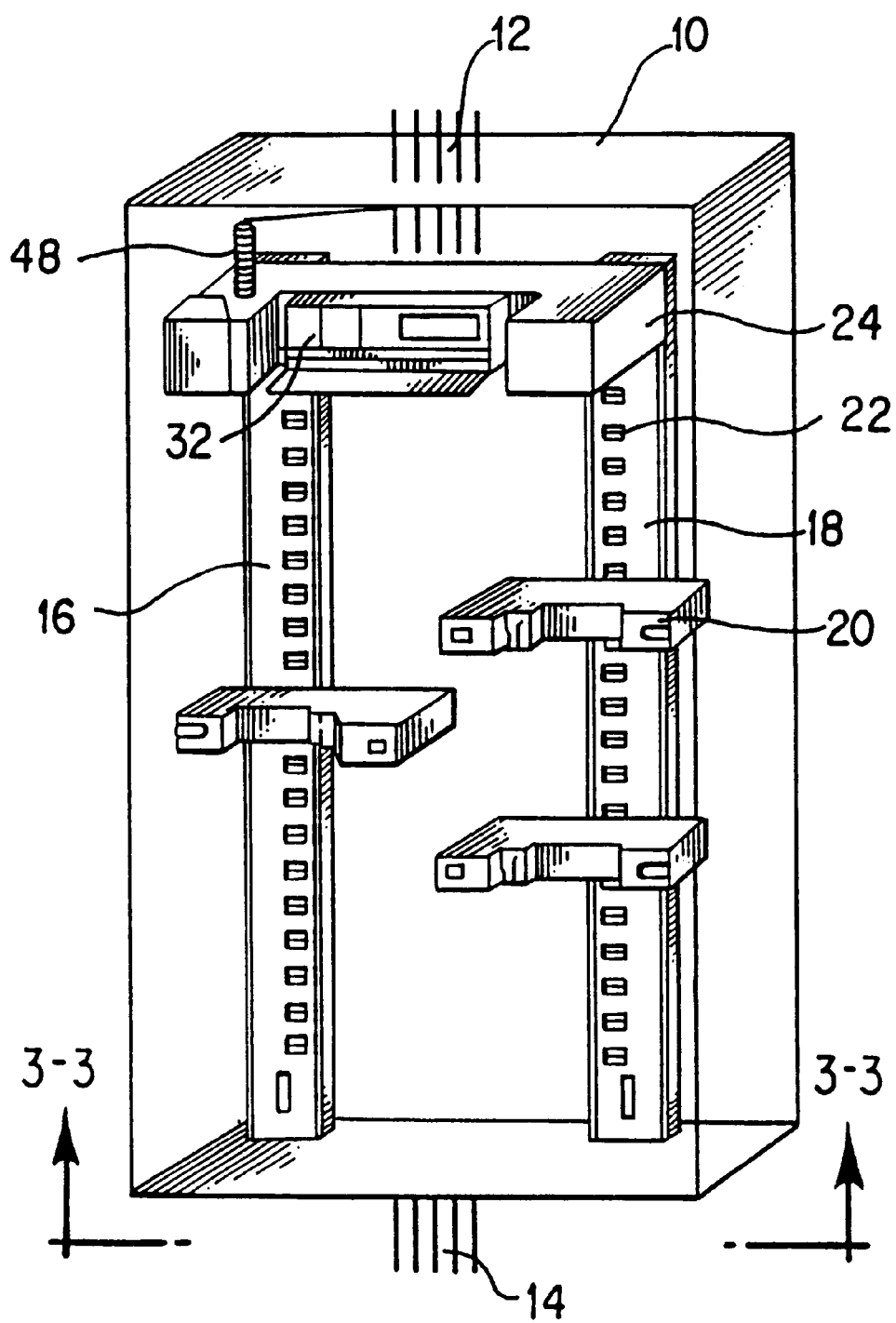
FIG. 1a is a perspective view of a load center arrangement or system, according to the present invention.
Figure 1B:
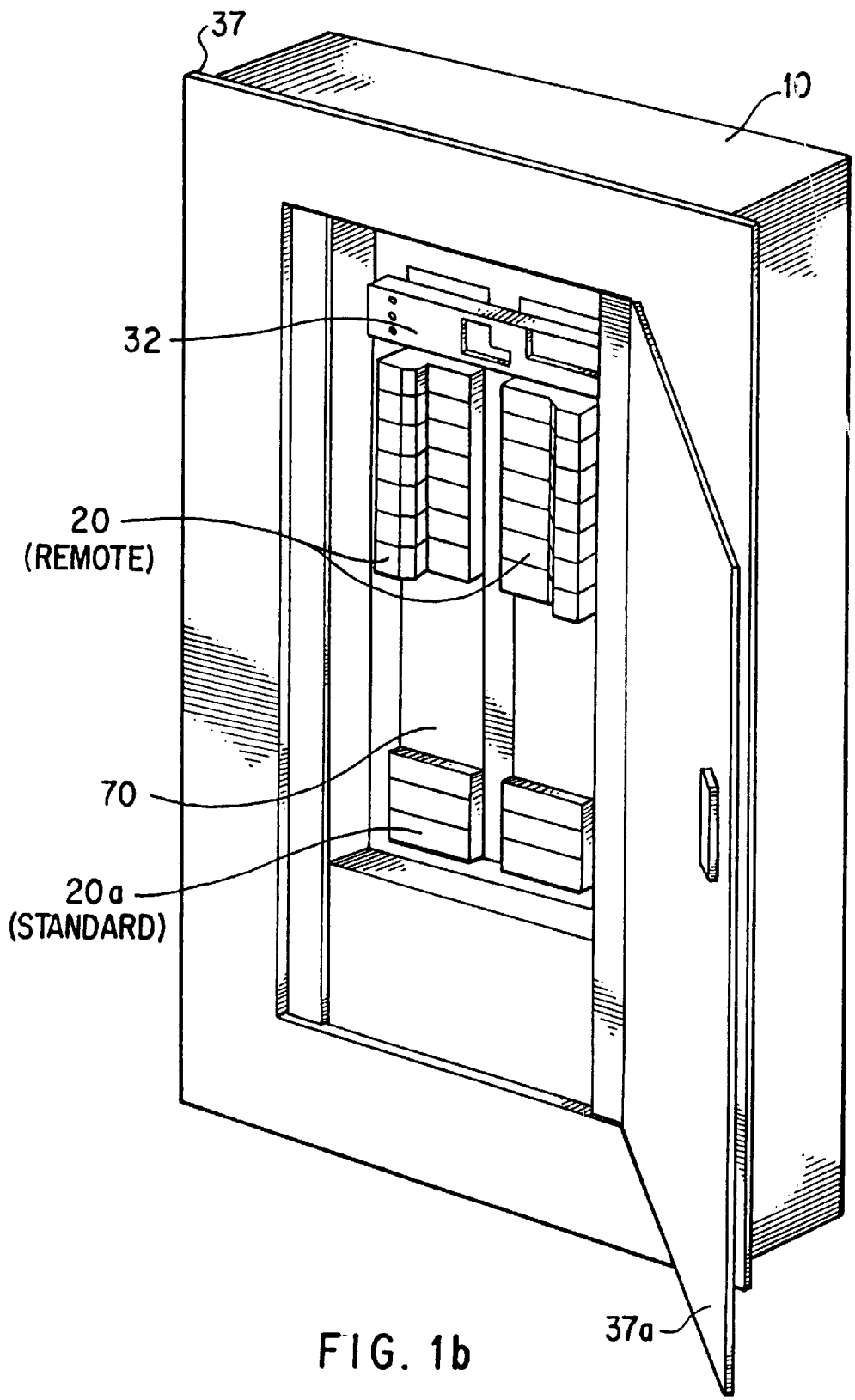

While the invention is susceptible to various modifications and alternative forms, specific embodiments thereof have been shown by way of example in the drawings and will be described in detail. It should be understood, however, that it is not intended to limit the invention to the particular form described. On the contrary, the invention is to cover all modifications, equivalents, and alternatives falling within the spirit and scope of the invention as defined by the appended claims.

DESCRIPTION OF THE PREFERRED EMBODIMENT

In FIG. 1a, the present invention is shown to provide an electrical distribution system or arrangement which may include a panelboard or load-center enclosure 10 which receives a plurality of input power lines 12 from a power source (not shown). Lines 14 exit the enclosure 10 to distribute power to various loads (not shown). Bus boards 16 and 18, which may be implemented on the same board, are disposed in parallel on each side of the load-center for mounting remotely controlled circuit breakers 20, each having a plug-in socket which is coupled to one of a plurality of connectors 22 on the bus boards 16 and 18. The connectors 22 are used with the bus boards 16 and 18 to carry motor control and contact-status signals, via an interface module 24, to and from the circuit breakers 20. Electrical switching devices other than circuit breakers may be used such as contactors or electrical relays.

A preferred circuit breaker, which may be used to implement the remotely controlled circuit breakers 20, is described in copending patent application Ser. No. 07/722, 050, entitled REMOTE CONTROL CIRCUIT BREAKER, which is filed herewith, assigned to the instant assignee and incorporated herein by reference. Another circuit breaker which may be used to implement the remotely controlled circuit breakers 20 is described in U.S. Pat. No. 4,623,859, Erickson et al., also assigned to the instant assignee and incorporated herein by reference.

Figure 2:
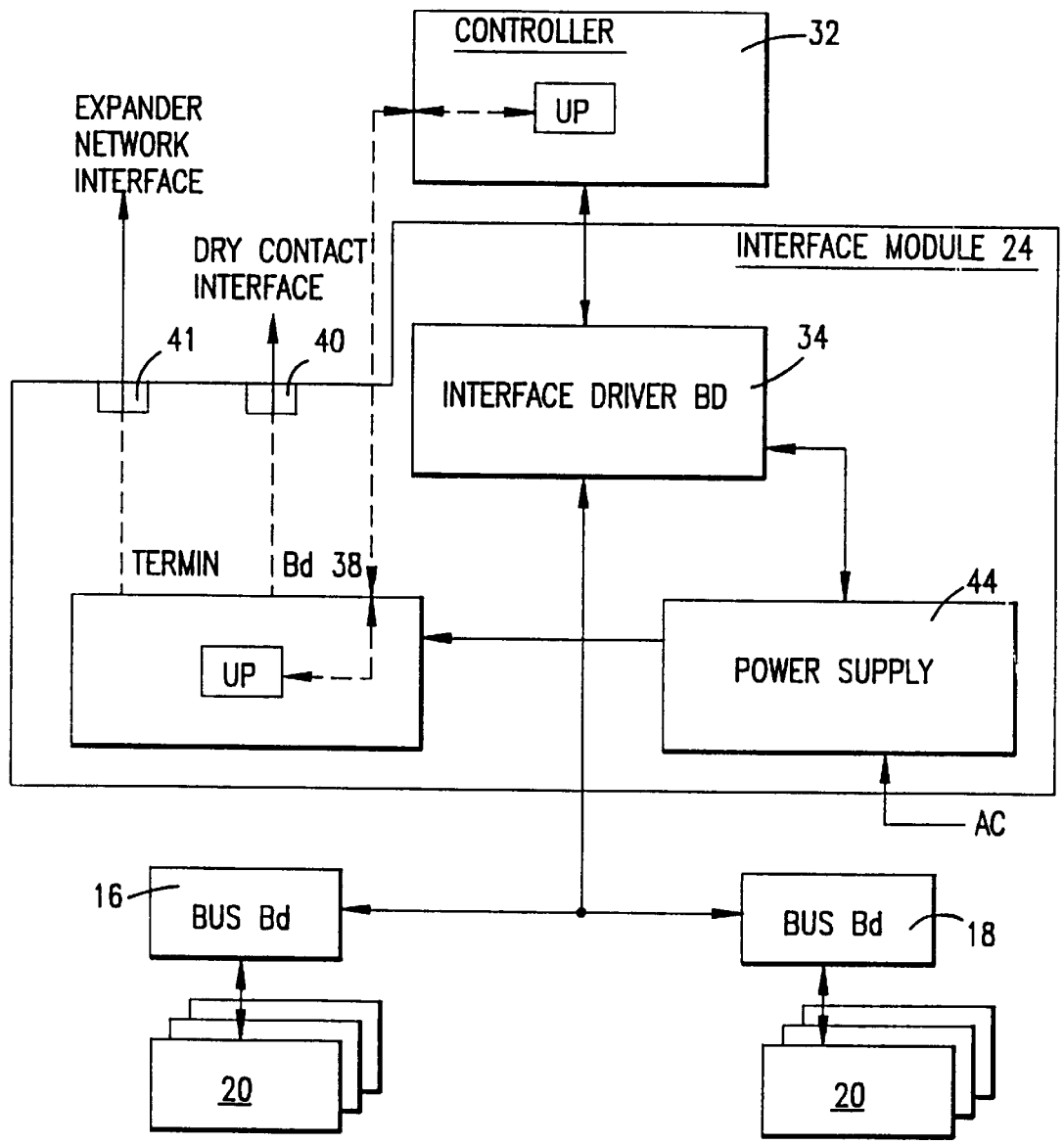
FIG. 2 is an electrical block diagram of the system shown in FIG. 1a, and including a controller, an interface module and a termination board which are intercoupled to provide the primary control functions of the system.
Figure 7:
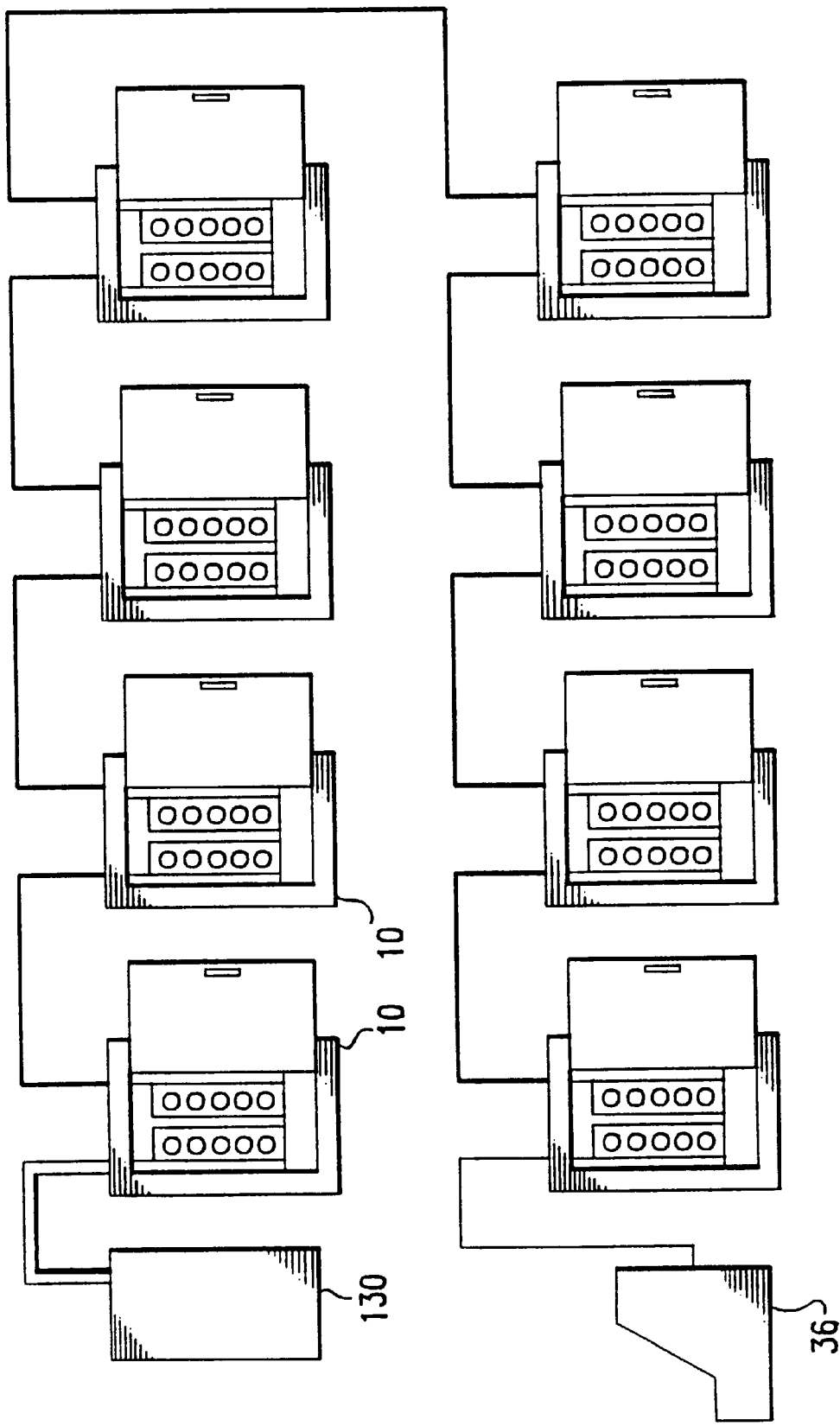
FIG. 7 illustrates a perspective view of a plurality of systems interconnected in accordance with the present invention.

As illustrated in the block diagram of FIG. 2, the interface module 24 interprets messages from a controller 32 so as to facilitate electrical control and monitoring functions from both local and remote locations. Both the control and monitoring functions are accommodated within the interface module 24 using an interface driver board 34. The interface driver board 34 provides a communications path between the circuit breakers 20 and the controller 32, which resides within, and as an integral part of, the load-center enclosure 10. The controller 32 may communicate with a remotely located control/monitoring device 36 (FIG. 7) via the termination board 38. Any such control or monitoring signal transmitted between the interface driver board and the circuit breakers is carried by one of two control buses on the bus boards 16 and 18.

The interface module 24 also includes a termination board 38, which is used to couple the control and monitoring signals between the interface driver board 34 and the remotely located control/monitoring device via the controller 32. Preferably, the control and monitoring signals are transmitted and received using either a direct-wiring (or dry contact) interface, as depicted at port 40 of the termination board 38, or a prescribed serial communication protocol (e.g., a wired or wireless LAN-type interface), as depicted at port 41 of the termination board 38. This coupling may also be accomplished using a number of different techniques, including, for example, those techniques discussed in U.S. Pat. No. 4,709,339 (issued to Fernandez), and co-pending U.S. patent application Ser. No. 07/503,267, by Lee Wallis.

Figure 3:
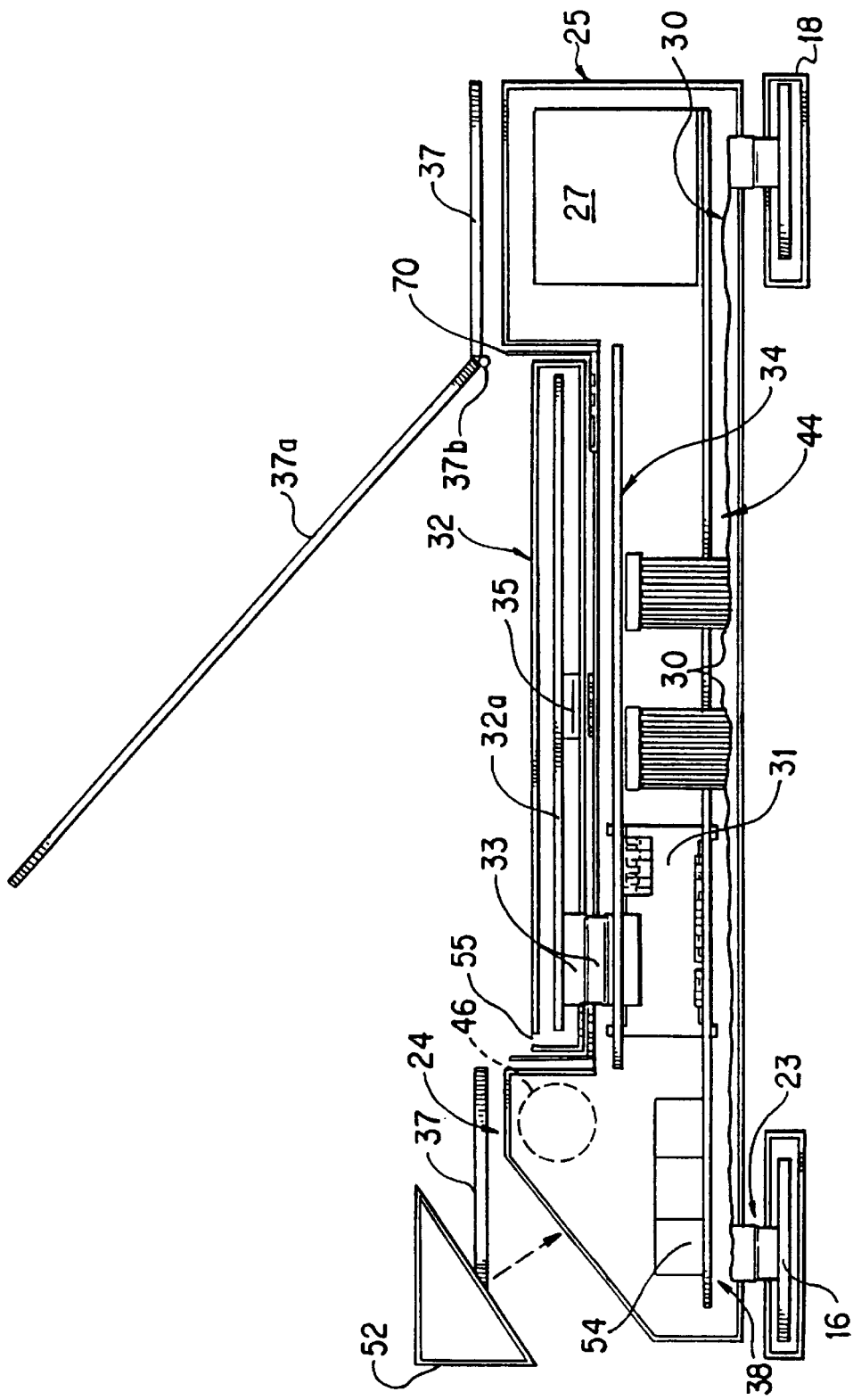

FIG. 3, which shows an end view of load-center components of FIG. 1a, best illustrates the above-described electrical arrangement of FIG. 2 from a structural perspective. FIG. 3 illustrates a manner of interconnecting the bus boards 16 and 18, the controller 32 and the interface module 24, the latter of which includes an interface module housing 25 for enclosing the interface driver board 34, a power supply board 44 and the termination board 38. The interface module 24 may be coupled to the uppermost or lowermost portion of the bus boards 16 and 18 according to the preferred viewing position. The interface driver board 34 is preferably coupled to the bus boards 16 and 18 via a pair of ribbon cables 30 and associated DB25-type connectors 23, and the interface driver board 34 is coupled to the power supply board 44 and the termination board 38 using an interconnect board 31. The connectors 33 may be offset so that the controller 32 overhangs the top or bottom of the load-center if desired. The controller 32 may be secured to the front panel of the interface module 24 using DB-9 connectors 33.

The controller 32 includes a controller circuit board 32a which may be secured to the front panel of the interface module 24 using DB-9 connectors 33. A membrane keyboard 35 is used to receive user inputs for controlling the circuit breakers and for programming the system.

The power supply board 44 and the termination board 38 may be implemented on a single printed circuit board or separate circuit boards. Further, a power transformer 27 is preferably attached to the power supply board 44 to provide power to the interconnect board 31. The transformer 27 may include two primary windings and three secondary windings to provide signals which may be processed using full-wave rectifier/regulator stages, such that +5 (Vcc), −5 and −24 Volts are provided along with their associated common signals, of which at least the latter two may be the same. In a preferred embodiment, one secondary winding provides the +5 Volt signal, the second secondary winding provides the −24 Volts signal, and the third secondary winding provides an isolated unregulated signal which is regulated to +5 Volts ($V_{iso}$ of FIG. 11a); and the −5 Volt signal emanates from the −24 Volt regulator.

A cover 37, including a cover door 37a rotating about a hinge 37b, is conventionally used to enclose the load center.

Also illustrated in FIG. 3 is a conduit mounting hole 46 on the interface module housing 25 for receiving leads, via conduit (not shown), which connect to input terminals 54 on the termination board 38. The leads include low voltage wiring for switch inputs, e.g., dry-contact type inputs or a LAN. A removable termination area cover 52 protects and allows access to the input terminals 54 of the termination board 38.

Another important part of the present invention concerns the location of the controller 32. As shown in FIG. 3, a deadfront panel 70 is used to isolate the power lines from operators and to cover the interface module 24 and most of the bus boards 16 and 18 and the circuit breakers 20 (FIGS. 1a and 2). The controller 32 is separated from the interface driver board 34 and located in front of the deadfront panel 70. This arrangement is advantageous for a number of reasons. For instance, it provides additional room for the circuitry within the interface module 24, which is located behind the deadfront panel 70.

Another advantage relates to the dissipation of heat generated by the circuitry within the interface module 24, as well as the circuit breakers 20. Unfortunately, the deadfront panel 70 has the potential to significantly increase the temperature resulting from the generated heat due to the lack of ventilation that would otherwise be provided to the interface module circuitry in the absence of the deadfront panel 70. Thus, by locating the controller 32 and its associated circuitry in front of the deadfront panel 70, the temperature of the circuitry is lowered and the cost and reliability of the circuitry is therefore improved.

Yet another advantage provided by this controller arrangement is the additional access it provides for operator interface. By using an informationally sophisticated monitor/control panel, such as is shown in FIG. 5a, within the load-center enclosure 10, an operator will need complete access to the various displays and control keys on the monitor/control panel.

Further, this arrangement allows an operator to easily replace or upgrade the controller without removing the deadfront panel and thereby exposing the operator to the power lines.

In order to allow removal of the deadfront panel 70 without disconnecting the electronics between the controller 32 and the interface module 24, the controller 32 may be coupled to the interface module 24 by a hinged pivot. In the operating position, the controller 32 would be held in position by a connector which attaches to the interface module 24. The opposite side of the controller would be attached by the hinged pivot such that the controller 32 could be perpendicularly pivoted away from the panel to allow for removal of the deadfront panel 70.

Figure 4:
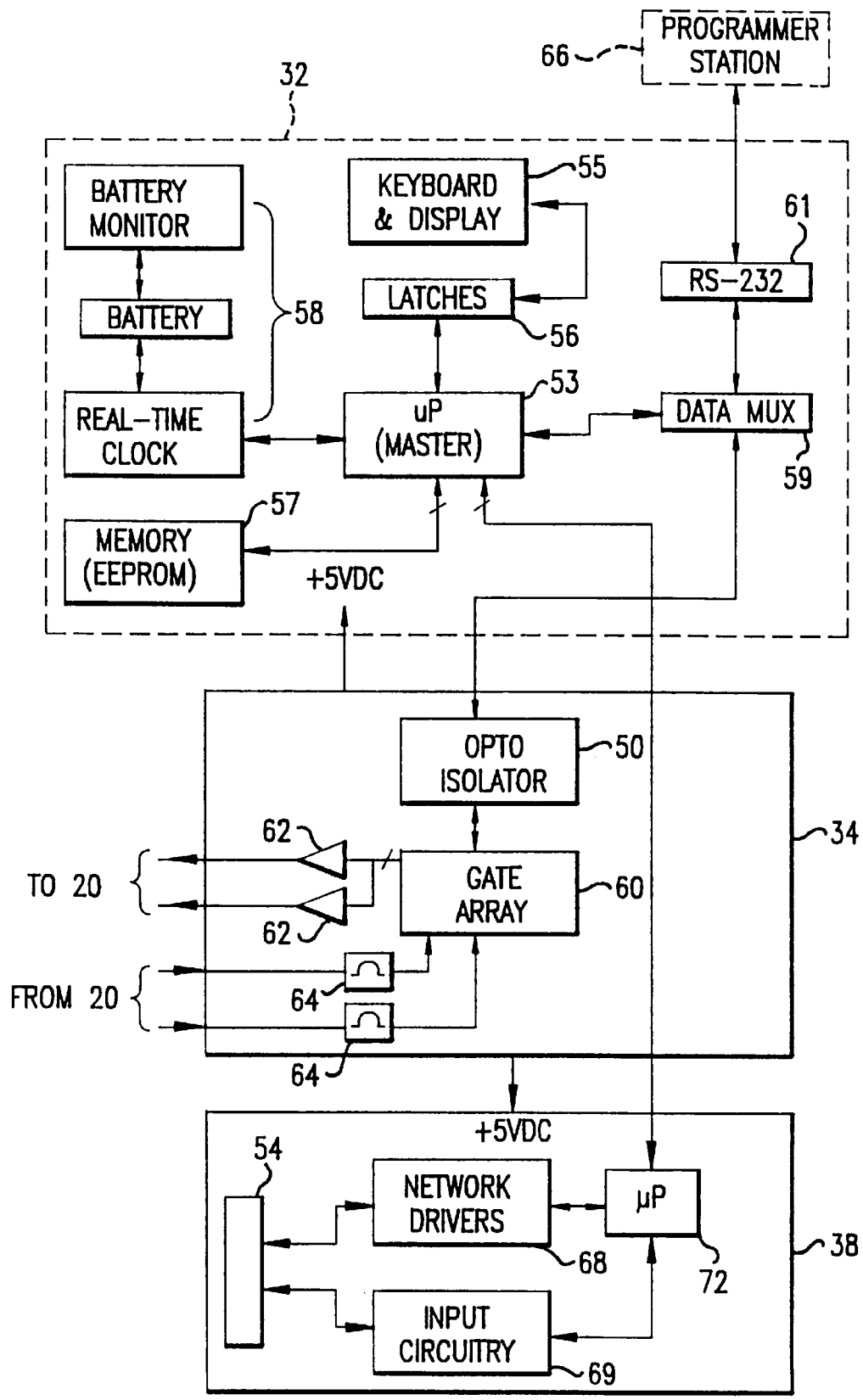
FIG. 4 is a more specific block diagram of the controller, the interface module and the termination board of FIG. 2.

In FIG. 4, an electrical block diagram of the controller 32, the interface driver board 34 and the termination board 38 is illustrated. The controller 32 includes a microcomputer 53, preferably an MC68HC05C4 (or C8) type available from Motorola, Inc., which communicates with a keyboard and display panel 55 through data latch circuitry 56. The user or operator is provided complete control over, and status of, the circuit breakers 20 through the keyboard and display panel 55.

The controller 32 also includes electrically alterable nonvolatile memory 57, which may be programmed by the user to contain specific information for operating each of the system's circuit breakers 20. Preferably, the memory 57 does not store the present state of the circuit breakers, since their state may be regularly accessed from the circuit breakers 20 themselves. However, a history of the circuit breaker activity may be recorded in the memory 57 for maintenance purposes.

In order to prevent memory endurance problems from limiting the life of the system, writes to the memory 57 are limited. Variable data is stored in the system RAM (internal to the microcomputer 53) as long as possible before any writes to the memory 57 are performed. Data is only written to the memory 57 at prescribed times during the programming mode of the controller 32. During the system run mode, data is not written to the memory 57 so as to prolong the life of the memory.

In order to prevent charge-drain off from the gates of the individual memory transistors (internal to the memory 57), the microcomputer 53 checks for valid data each time that the memory is read. Charge-drain off occurs to only one transistor at a time and is corrected by a single bit error code that determines the validity of the data in the memory. Normally, the data is valid and no further action with respect to the memory is required. However, if an error is detected, an algorithm is run to determine if the error is a charge drain-off error or a noise error. If it is an error due to noise, the correct data is read again from the memory and used. The erroneous bit will be corrected if the error is a hard error, and the corrected data will then be written to the memory. This is the only instance where the memory is written during the run mode rather than during the program mode.

Conventional circuitry 58 may be optionally provided to provide reliable, battery-backed real-time clock functions for the system. For example, this may be used to allow time-phased events to trigger certain ones of the circuit breakers 20.

The interface driver board 34 is shown as interfacing with the controller 32, through a data multiplexer 59, using an optical isolator 50 to maintain voltage isolation between the circuits and protect the circuits from power-line transients. The data multiplexer 59 also provides electronic programming capabilities from a programming computer or station 66 for accessing the controller functions. This is preferably accomplished using serial interface circuitry 61, e.g., for an RS-232 type protocol, between the data multiplexer 59 and the station 66. The interface driver board 34 and the controller 32 may be coupled in this manner using a serial protocol to reduce the number of pins required for communication therebetween.

The interface driver board 34 further includes a gate array 60 which couples the interface driver board 34 through amplifiers 62 to the motors of the remotely controlled circuit breakers 20 in order to significantly reduce the number of required driver transistors and PC board traces. When the interface driver circuitry is commanded to engage a breaker (i.e., open or close the breaker contacts), the gate array 60 essentially maps the address of the circuit breaker into a form which will turn on any two of a plurality of power output transistors associated with the gate array 60. Timers within the gate array 60 drive power transistors 62 external to the gate array 60 to control the circuit breaker motor engagement time and status read times. For example, a pair of power transistors may drive the circuit breaker motor in either of two directions for a controlled time period in order to turn the circuit breaker on or off by closing or opening the contacts. After the motor drive time period elapses, the status of the selected circuit breaker is automatically read after a specified settle time and is passed to the communications circuitry of the gate array 60. Only one circuit breaker can be switched at a time, and sets of breakers must be turned on or off sequentially.

Because of the limited physical space available for the power driver circuitry of the gate array 60, a minimum circuit breaker cycle time, i.e., the time period to complete the tasks and communications associated with a single command, is observed. This cycle time allows the power supply to sufficiently recharge the power supply storage capacitors (which may be located at the input of the −24 Volt regulator) to supply full voltage to the circuit breaker motors.

The status signals provided by the selected circuit breaker 20 are filtered by noise filters 64 before being provided to the gate array 60, which transmits the circuit breaker status to the controller 32 through the optical isolator 50.

In addition to controlling and monitoring the circuit breakers 20 from the keyboard and display panel 55, the circuit breakers 20 may be accessed using the microcomputer 53 of the controller through the termination board 38. For such communication with the controller 32, the termination board 38 includes a microcomputer 72 to communicate directly with the microcomputer 53. A significant advantage of this arrangement is that it allows a multitude of remote devices to control and monitor the circuit breakers in the same manner as with the keyboard and display panel 55.

The termination board 38 includes a communication or input terminal port 54 for remote device access to the controller 32. As previously indicated, such remote access may be provided by hard-wiring the devices to the input terminal port 54 with common, positive and negative leads at the respective terminals. A set of network drivers 68 may be used to provide the requisite network interface, and additional input circuitry 69 may be used to custom-program interface specifications.

The input circuitry 69 may include, for example, trinary DIP switches mounted to the termination board 38 which are utilized to program pulsed and maintained control modes of the plurality of inputs at terminal port 54. A single switch may be included for each of the plurality of input terminals 54. Each of the switches preferably have both pulsed and maintained labels to allow the system operator set the DIP switches according to whether the connected inputs are pulsed or maintained.

In one application, a pulsed input may refer to any of the plurality of input terminals at terminal port 54 which remains active for less than sixty seconds. Using this sixty second limitation, a maintained input then refers to an input signal which does not make two state transitions within a time period of less than sixty seconds, a transition being an input change between a pair of prescribed high and low voltage levels. The microcomputer 72 then uses the DIP switch setting to determine if an input is pulsed or maintained.

Common, positive and negative leads may be used to control either pulsed or maintained modes. For a maintained input, only two of the three terminals (common, positive and negative) are used and the DIP switch is set to its maintained position. The common terminal is always connected for any input. The positive terminal is connected to normally open contacts, the negative terminal is connected to normally closed contacts. If a closing contact is to cause an associated circuit breaker to switch, the two wires from the contacts connect between the positive and common terminals. If an opening contact is to cause a circuit breaker to switch, the wires connect between the negative and common terminals. If the DIP switch associated with a given input is set to the pulsed position, the input will be programmed to pulse mode operation. Two or three wires are connected to the terminals in the pulsed mode. When a positive terminal is connected, a closing contact causes each selected circuit breaker, or group of circuit breakers, to open or close according to the user program. When a negative terminal is connected, the closing contact causes each selected circuit breaker, or group of circuit breakers, to do the opposite of the positive terminal.

The pulsed mode is useful for normally open momentary wall switches used to override the automatic operation of the system. A first input is programmed to turn off a selected circuit breaker at a selected time. Next, a momentary, normally open two position wall switch is programmed to control the same circuit breaker using a second input. The system turns the selected circuit breaker on automatically when the contact of the first input is closed. The circuit breaker turns off when the contacts of the first input are open. The momentary switch of the second input may override the state of the contacts. If the switch is placed in the on position, the circuit breaker turns on regardless of the state of the contacts. Likewise, if the switch is pushed off, the associated circuit breaker would turn off regardless of the state of the contacts.

The contractor may optionally include a feature in the system while setting the input terminals wherein the system may autostep to used inputs while skipping unused inputs during programming. To enable this feature, the contractor sets the corresponding trinary DIP switch to the center position. When in program mode, the system looks for these shorts and does not display them on the front panel of the controller such that the user cannot program them. If this condition is not present, the system shows the inputs on its display during normal programming. The programmer may choose not to program these inputs thereby achieving the same result. If the condition is not present, the pulsed or maintained DIP switch settings are ignored.

The controller 32 initiates all communications to the gate array 60 by sending a two byte message which minimizes communications protocol errors. The first byte of the two transmitted bytes is equivalent for communications either to or from the interface driver board 34 or controller 32. A byte number is placed in the least significant bit position of all transmitted bytes to reduce the chance of unsynchronized messages. Accordingly, bit zero of the first byte always has a value of zero because it indicates the byte number. Bits one through four indicate the circuit breaker address and are the least significant bits of a particular circuit breaker address. Bits five through seven are check bits which are generated to check bits one through four. The format for the second byte of a message differs depending on whether it is sent from the interface driver board 34 or the controller 32. Messages sent from the controller 32 are command bytes. In the second command byte, bit zero is always one because it signifies byte two of the message. Bits one and two are the most significant two bits of the circuit breaker address. Bits five through seven are generated to check bits one through four. Bits three and four are encoded with four possible commands to the interface driver board 34. The controller commands are to read the motor, read the contact status, open a selected breaker or close a selected breaker. When the most significant bit of the command code is a zero, the interface driver board 34 only sends back a status. If the most significant of the two bits is a one, a switch command is sent to the interface driver board 34.

Messages sent from the interface driver board 34 are status bytes. The second byte of a status message may differ from the second byte of a command message in bit positions three and four. In a status byte, bit four is a status and bit three is always zero. These bits indicate the presence of a motor in the circuit breaker, the status of the contact, i.e., whether a selected breaker has been opened or closed.

If the interface driver board 34 detects an error in either byte one or byte two, no circuit breaker switching or status reading occurs. An all 1's error message is returned and the interface module is reset to wait for the first byte of the next command. The controller 32 then retransmits the previous message. Accordingly, if the controller 32 sends a read status message, the interface driver board 34 reads the circuit breaker status and returns the results to the controller 32. If the controller message is a switch command, the interface driver board 34 carries out the command by switching the breaker. It then reads and returns the contact status of the selected breaker. The interface module response to a read status message is the desired status of the contacts of the selected circuit breaker. The interface module response to a switch command is the actual status of the contact after the switch has occurred. The controller 32 uses the returned information to ascertain whether the selected circuit breaker has switched. If the returned status shows that the contacts are in the wrong state, the controller 32 may be programmed to attempt to correct the problem.

A seven bit cyclic hamming code detects errors in the most significant seven bits of a message byte. The byte number bit is excluded because there is no available hamming code which will detect seven bits with three check bits. The exclusion is insignificant since parity detects any odd bit error in any bit position. If a two bit error occurs in any message byte which includes bit zero, the hamming code will detect it because the other seven bits of the byte are checked by the code. If a controller command is retransmitted multiple times and an unexpected status is received from the gate array 60, the controller may be programmed to display the error and may then discontinue transmitting the command thereby assuming that the circuit breaker has failed.

As can be seen in FIG. 5a, the keyboard and display panel which is shown in FIG. 4 is preferably implemented as part of a flip-open housing which encloses the controller circuitry of FIG. 4, except for portions of the keyboard and display panel 55. The controller 32 comprises a system display which provides an interface to allow a user to program the system responses according to the programming provided at the input circuitry 69 of the termination board 38.

The system may operate in any of four modes: run, halt, manual or program. The run mode represents the normal operation of the system, including provision of the primary functions of controlling and displaying the status of the circuit breakers. When the system is first powered on or comes up after a power down, it may enter the run mode. In this mode, the controller 32 may drive the system display, scan the control buttons, and look for changes at the plurality of inputs.

The system regularly scans all of the circuit breaker status lines and displays the results on a plurality of LEDs 90. The LEDs 90, which indicate the open or closed status position of the circuit breakers 20 are conveniently arranged to correspond to the arrangement of the circuit breakers 20 as viewed from the front of the load center (as shown in FIG. 1a). When the system commands a circuit breaker to switch, the actual status of the circuit breaker will be displayed on a status indicator display 92. The status of all of the remotely controlled circuit breakers appears in the same configuration as the breakers are arranged in the load-center. The breaker statuses may be polled only periodically, rather than constantly, to avoid communications protocol traffic and reduce panel temperatures. Preferably, however, the breaker statuses are polled as fast as possible so as to provide immediate responses.

When the front cover 94 of the front panel 96 is closed, the status indicator 92, the breaker status button 98 and the breaker select button 100 are accessible to the user. While the enter button 102 is accessible to the user only when the front panel 96 is open, these buttons 98 and 100 allow a user to switch a selected circuit breaker and display the breaker status on the status indicator 92 while in the run mode. Instructions (not shown) may be affixed to the exterior of the front cover 94 to instruct the user as to operations for switching circuit breakers during the run mode.

The display will display the number of the last circuit breaker which the user programmed or manually switched. The status display 92 indicates whether that breaker is open, closed or unaffected by the switch. If the breaker statuses are polled only periodically, the breaker status indicator 92 is blank in order to limit the amount of power continuously dissipated in the circuit breaker status read circuitry. If the status LEDs 90 were on continuously, power would be dissipated in the opto-isolator drive circuitry raising the temperature inside the breaker to that which may exceed the opto-isolator specifications.

In order to manually open or close a selected circuit breaker, the user selects the desired circuit breaker by pressing the breaker select button 100 until the number of the desired circuit breaker appears in the breaker display 104. Each time that the breaker select button 100 is pressed, the system automatically scans for the next installed circuit breaker. The position of the circuit breaker that is found is displayed in the breaker display 104. The user continues to press the circuit breaker select button 100 until the number of the selected circuit breaker appears in the breaker display 104. The circuit breaker that is manually switched will remain in the desired state until another manual or automatic signal causes it to switch.

Alternatively, the status indicator display 92 and the breakers status button 98 may be replaced by status indicator lights and a breaker status button located on the front of the load-center dead front 70 next to each circuit breaker 20. When the system is in operation, the indicator light of each breaker is lit when the breaker is on, and is unlit when the breaker is off. When the programmer selects an input by using the input select button 106, the desired circuit breaker is selected by pressing the button next to that breaker.

When the front cover 94 is opened, additional buttons and display become accessible. The system mode is selected using the run mode button 108, the halt mode button 110, the manual mode button 112 or the program/review mode button 114. When the system first enters the run mode from either the halt or manual modes, it scans the terminals at input terminal port 54. Since pulsed inputs are lost in both the half and manual modes only the maintained inputs are available for scanning. As the inputs are scanned, the equations for all of the available circuit breakers are solved, and the breakers are switched accordingly. After this initial scan, the system reverts to normal run mode operation and scans both pulsed and maintained inputs. The system regularly scans the inputs and display buttons while driving the various display devices. There are no other controller actions until an input transition occurs, or a button is pressed.

If an input transition occurs, the microcomputer on the termination board will debounce and interpret the input. The microcomputer on the controller receives the interpretted input from the termination board and then switches the circuit breakers accordingly. Similarly, if a button on the front of the controller is pressed, the microcomputer on the controller will debounce, process, and act on the user input according to the function of the button. As the circuit breakers are switched, their actual status is displayed on the status indicator 92. Additionally, the last input which goes through a transition is displayed on the input display 116.

The system enters the halt mode when the halt mode button 110 is pressed by the user. The halt mode ignores the plurality of input terminals 54 and leaves the system in its present state. Once the halt mode is entered, the system remains there until the user presses another mode button. System status information is not stored while in the halt mode such that if a pulse occurs it will be missed. To exit the halt mode, the user presses any of the other three mode buttons. If the system is halted and either the manual or program/review button is pressed, the selected mode is entered with no further action from the controller 32. If however, the run mode is entered after the halt mode, the system will scan all programmed inputs and set the system circuit breakers 20 according to the values present on the maintained inputs. Pulsed inputs that occurred prior to entering the run mode are not acted upon.

The manual mode is entered by pressing the manual mode button 112. In the manual mode, the system sequentially switches all circuit breaker motors to their on state and then displays the current status on the status indicator 92. This action places the circuit breakers in a mode which emulates standard manual circuit breakers. While in this mode, the circuit breakers can only be controlled by the handles of the individual breakers because all inputs are ignored as in the halt mode. The manual mode differs from the halt mode in that it changes the state of the circuit breakers to their on position. When the system is in the manual mode and either the halt or program/review buttons are pressed, the system immediately enters the new mode without further action by the controller. If the run mode button is pressed, the system scans the maintained inputs and sets the affected breakers accordingly.

The program/review mode is one means by which the system may be programmed. This mode is used to enter, modify or review circuit breaker control programs. The user presses the program/review button 114 to enter the program/review mode. When this mode is entered, the system remains in the run mode from the standpoint of the system's reaction to input transitions. The system continues to process input transitions even if the user is programming the circuit breakers. Unlike the other operating modes, the program/review mode has an auto exit feature. If no button is pressed for a selected time period while the system is in the program/review mode, the system reverts to its previous mode.

Upon entering the program/review mode, the input channel to be programmed is displayed in the input display 116 and the circuit breaker to be programmed is displayed in the breaker display 104. The input display 116 and breaker display 104 are incremented or decremented by using the input select button 106 and breaker select button 100, respectively. As described above, the system automatically scans for the next installed selection as either of these buttons is pressed. If no circuit breakers are installed in the system, the system display is blank in order to prevent a never ending loop. When the + button of the respective buttons 106 or 100 is pressed, the inputs or breakers are scanned in ascending order and the next available input or breaker is displayed. Conversely, if the – button of the buttons 106 or 100 is pressed, the next available input or breaker is displayed after scanning the inputs or breakers in descending order. In program/review mode, the status indicator 92 will display how the circuit breaker on the breaker display 104 will respond to the input on the input display 116 rather than displaying the actual circuit breaker status. The input signal type is displayed on the signal display 118 as maintained or pulsed.

To aid the programmer in configuring the system, a technique is employed to ease understanding of the logical connections. The programmer completes a sentence for each input, wherein the sentence is "When input (number) detects a (pulse or maintained) signal, the breaker (number) (opens, closes or is unaffected)." This sentence is printed on the input and breaker display area of the display panel. The programmer simply enters the input number, signal type, breaker number and desired circuit breaker status and presses the enter button to program the system. No permanent program saving function occurs until the enter button is pressed. If enter is not pressed, the front panel button can be pressed without permanently changing the program. This method is used to review the program content.

An input which overrides all other inputs for a given circuit breaker may be programmed by the user as a pulse input. This input is defined as an override off and is represented on the display panel 55 by an open circuit breaker status light on the status indicator 92 while in program mode. An override off input opens a given circuit breaker regardless of the status of the other inputs. If a selected input is not programmed as an override off, it remains unprogrammed or is programmed as a normal input.

The circuit breakers 20 of FIG. 1a are numbered in two columns: circuit breakers in the left column start at one and are odd numbered, and circuit breakers in the right column start at two and are even numbered. The LEDs 90 are preferably arranged and numbered in the display of FIG. 5a to correspond physically to the arrangement of the circuit breakers 20 of FIG. 1a.

An example may be helpful to explain the convenient manner in which the display of FIG. 5a may be programmed and monitored to control the circuit breakers 20 of FIG. 1a. In this example, a user is to program a three pole circuit breaker occupying circuit breaker positions numbered 7, 9 and 11 and a single pole breaker in circuit breaker position 16 to be in the same states at the same time. Assume that inputs A, B and C are connected to terminals 1, 2 and 3 (of the eight input terminals of the termination board 38) respectively, and the override off input is connected to terminal 12. Inputs A, B and C will be normally open maintained contacts. An override off will be a pulsed input. The first three terminals have one contact wire connected to its positive terminal, and one wire connected to its common terminal. The DIP switches associated with inputs 1, 2 and 3 are set to the positions corresponding to the maintain mode. The override off input wires are connected to the positive and common terminals and the DIP switch is set to its pulsed position. The motor pole of the three pole breaker is in the center and is in circuit breaker position number 9, and the single pole breaker motor will be in circuit breaker position number 16.

Proceeding from left to right on the front display panel, input 1 is selected by pressing the input select + button 1 until a 01 appears in the input display. Next, the user selects the desired circuit breaker by pressing the breaker select + button until a 09 appears in the breaker display 104. Each time the + button is pressed, the system automatically searches for the next breaker motor. This method eliminates the possibility of a user programming an unused circuit breaker position since empty circuit breaker positions do not appear in the display. When the 09 appears in the breaker display 104, the status appears on the status display and MAINTAIN appears on the signal display signifying that the input is maintained. An appearance of a maintained signal is to cause a circuit breaker to close; therefore, the breaker status button 98 will be pressed until the LED next to "CLOSES" is lit and the CLOSE LED associated with breaker in position 9 in the open/close LED array also lights. While in this programming mode, all LEDs associated with the circuit breakers to be controlled by the displayed input will light as either an open or close.

At this point, the programmer can press any of the buttons without danger of changing any of the programming. If the operator presses the halt mode button, the system will enter the halt mode without changing anything. If the operator fails to press a button for a given controlled time, the system will revert to its previous state automatically. However, if the enter button is pressed, the information on the current display will be permanently stored in memory. The status display will momentarily flash to signify that the breaker is now permanently programmed.

After breaker 9 is programmed using input 1, breaker 16 is programmed by pressing the breaker select button until a 16 appears in the breaker display. When the 16 appears in the breaker display, the current breaker program appears in the status display and MAINTAIN appears signifying that the input is maintained. The breaker select button is pressed until the LED next to "CLOSES" lights. After the enter button is pressed, the input display will display a 01. The breaker display will contain a 16, and the status display close lights will be on in the 9 and 16 positions. Note that while in program/review mode the status indicator display displays the affect that one input has on all of the breakers. After programming all breakers associated with a given input, the next input is selected by pressing the input +button once so that a 02 appears in the input display. The breaker and breaker status are selected as described above. The same procedure is followed for input 3.

Now that the three inputs A, B, and C are programmed, the override off input is programmed to complete the programming operation. The input +button is pressed until a 12 appears in the input display and the pulse light appears on the signal display to signify that the input is a pulse. The breaker number is then selected as described above. Programming proceeds as described above except that status open is selected instead of status closed. When the enter button is pressed, the status indicator display shows a closed light under circuit breakers at positions 9 and 16 to signify that the input and breakers are programmed. Note that the override off input will override any of the other inputs regardless of their states to open the circuit breakers at positions 9 and 16.

Figure 5B:
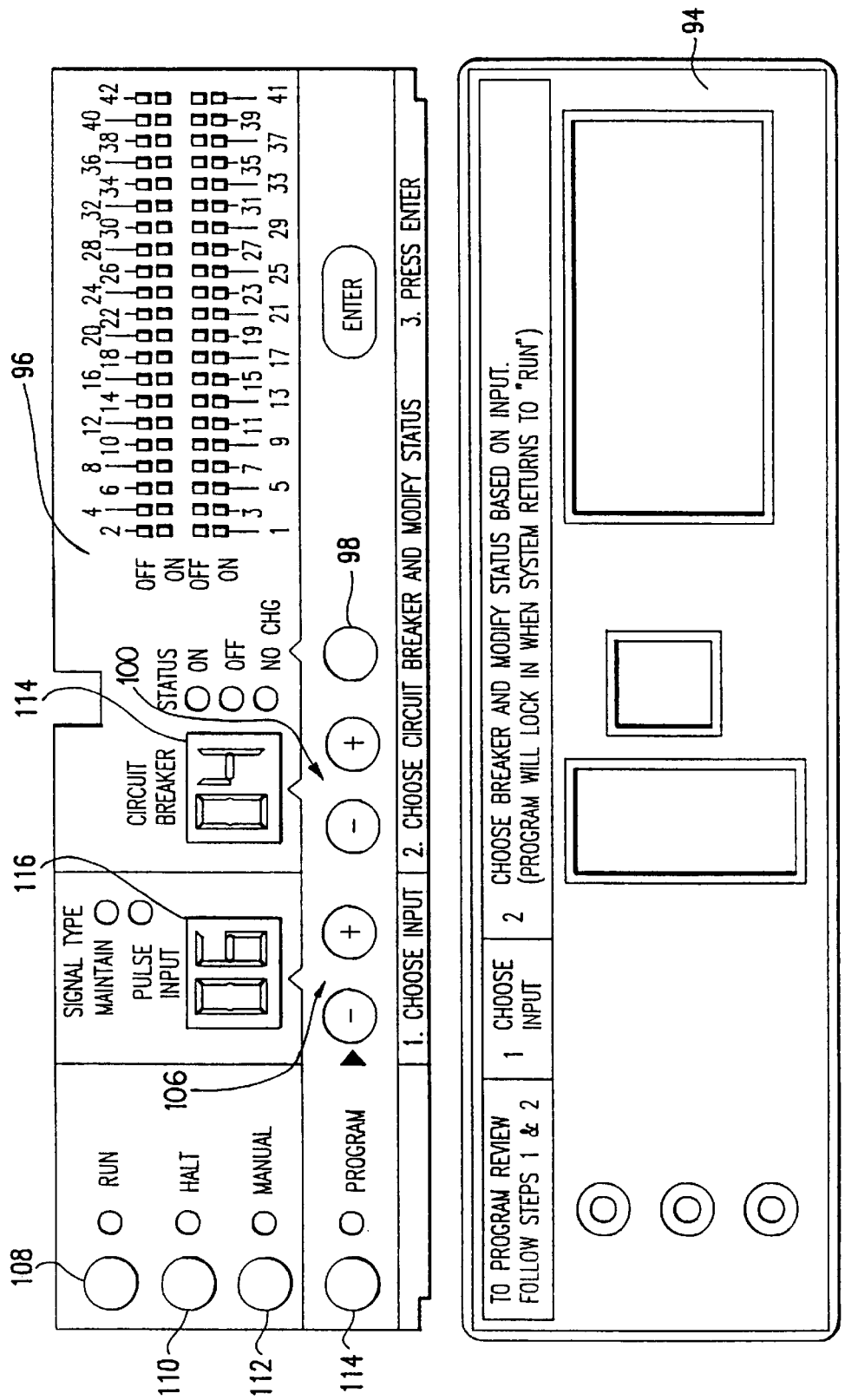
FIG. 5b is a perspective view of an alternate display for the controller shown in FIGS. 1–4.

An alternative display embodiment of the present invention is illustrated in FIG. 5b. In this embodiment, a three-step programming configuration is used in place of the sentence-programming configuration discussed above in connection with the embodiment of FIG. 5a. In terms of function, this display embodiment is the same as the display shown FIG. 5a; thus, the reference numerals depicting the various components in FIG. 5a are used to depict the corresponding components in FIG. 5b.

The primary difference between the respective embodiments of FIGS. 5a and 5b is that the enter or "LOCK-IN" button of FIG. 5a is replaced by the "enter" buttom in FIG. 5b. Rather, the display of FIG. 5b locks in the programmed inputs when the system returns to the RUN mode via button 108.

As a controller circuit option, unauthorized access to the programming function of the controller 32 may be prevented using a key card mechanism 103 (FIG. 5a) to lock out the programming function. The key card 103 comprises a small durable card having a pattern of holes wherein the card is designed to be placed into a card slot 105 in the front of the controller 32. An LED/photo detector combination located within the controller 32 detects the presence of the key and determines the particular function from the key card pattern. The key card allows access to particular modes of operation thereby providing security for the system. An exemplary key card mechanism is described in U.S. Pat. No. 4,489,359, incorporated herein by reference.

Figure 6:
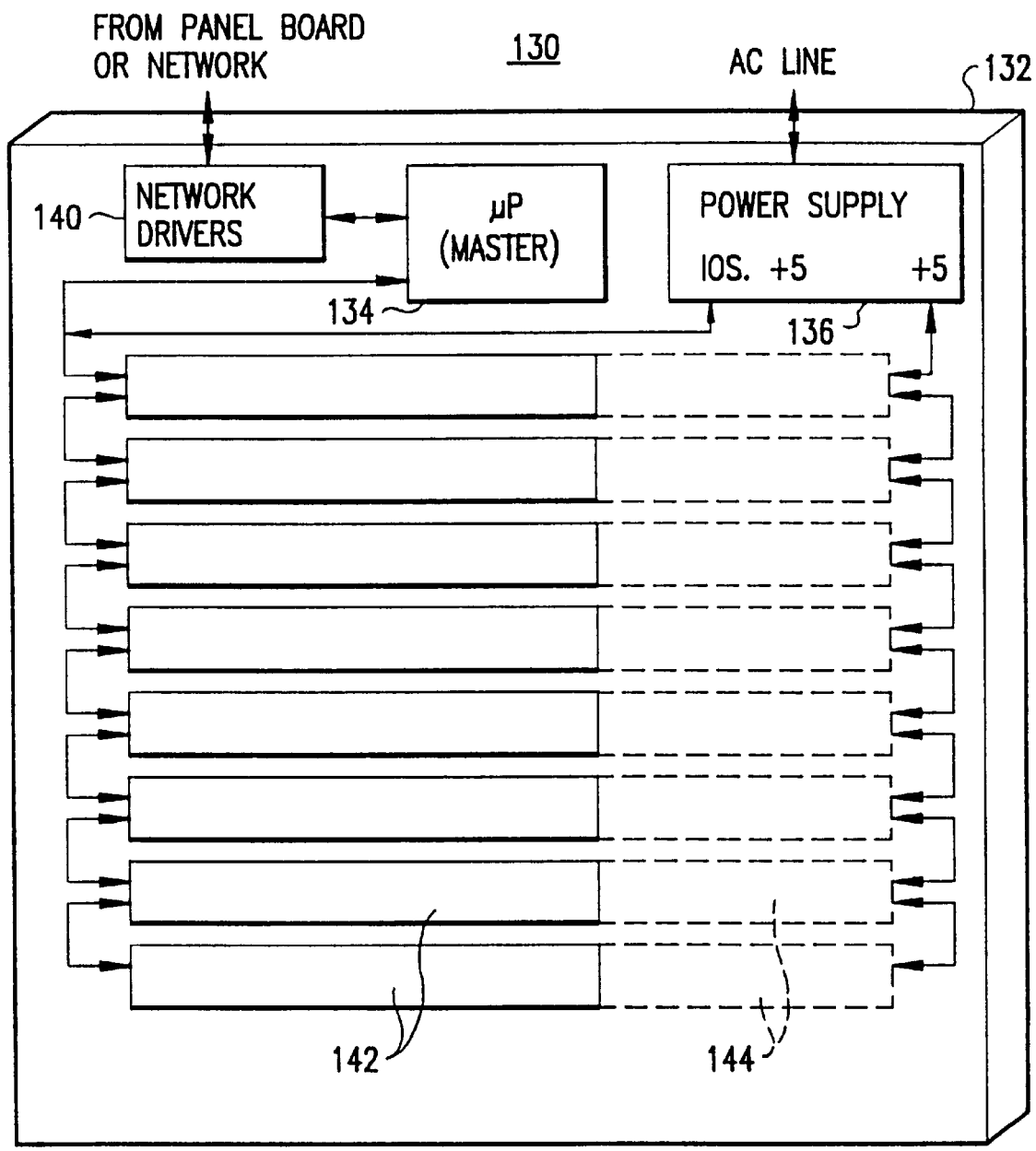

FIG. 6 illustrates an expander panel 130 which may be optionally coupled to one or more load centers, such as the load center 10 shown in FIG. 1a, to provide a number of communication-related features to the load center shown in FIG. 1a. The expander panel 130 is enclosed in a housing 132 and may include a microcomputer 134 for controlling communication with the load centers. A power supply 136, fed by a conventional AC line, may be used to provide power to the circuits contained within the housing 132, and a network driver circuit 140 may be used to interface the microcomputer 134 with a communication network or protocol required for communication with the load centers.

By employing one or more terminal ports 142 within the housing 132, external devices may be electrically coupled to the microcomputer 134 for additional kinds of remote control and monitoring of the circuit breakers, their associated current paths and other equipment associated with the controller. Ideally, the microcomputer 134 communicates through the network driver circuit 140 of FIG. 6 to the controller 32, via the network drivers 68 of the termination board 38 (FIG. 4). LAN or other types of conventional communication protocols may be used to implement this kind of interface, as previously discussed.

The expander panel 130 may also include one or more option cards (or circuits) 144 for providing customized functions. In a preferred embodiment, one of the option cards 144 is a telephone interface circuit, which is designed using conventional techniques to provide access to the controller 32 (FIG. 4) through standard telephone lines. Other option cards 144 may include, for example, an input expander card for allowing additional devices to be coupled into the system, an isolated RS232 computer interface, data logging memory with battery back-up, data logging printer interfaces, telephone network access card, telephone modem cards, wireless (FM) communication links and fiber optic repeater cards. The functions described in the expander panel may be built and installed as separate functional elements.

The expander panel, which has plug-in modularity, may be used to provide a number of network-communication type features. Although multiple load center (such as 10 of FIG. 1a) may be networked without the expander panel, FIG. 7 exemplifies an application in which a plurality of load centers may be connected in a LAN by networking the load-centers 10 with one of the expander panels 130 of FIG. 6. This kind of arrangement can provide significant maintenance-related savings when used in an industrial-type application.

Turning now to the schematic diagram of FIG. 8, the controller 32 (from FIG. 4) is shown with the keyboard and display 55 (FIG. 4), the real-time clock circuitry 58, the data multiplexer 59 and the RS-232 interface circuitry in detail. The keyboard and display 55 includes a 10-key membrane keypad 160 which is regularly scanned using a four-by-three switch matrix. To determine which, if any, of the membrane keys have been depressed, the microcomputer 53 latches logic "0"s from each of four bits from the microcomputer's C port into a latch 162, and it polls three bits from the same port to determine if any of the three bits are shorted to one of the latched four bits by the depression of the associated membrane switch. Pull-up resistors 164 bias the three polled bits so that a logic "1" is read at each polled bit if the associated four switches are not depressed.

The latch 162 and the microcomputer's C port are used in combination with the microcomputer's A port to control all of displays on the controller 32, including four 7-segment LED package displays 165–168. As discussed in connection with the breaker display 104 and input display 116 of FIG. 5a, the displays 165–168 are used to identify for the user or operator the particular input (at the termination block 38) and circuit breakers being addressed by the keypad. A network of eight Darlington transistors 170 is coupled to the output of the latch 162 to provide the proper drive level for display matrix for which the outputs (A–H) of the transistors 70 drive the row side of the matrix. The column side of the display matrix is driven by 8 bits which are provided directly from the A port of the microcomputer 53 and 8 bits which are provided indirectly from the A port, via latch 172, to enable each LED of the displays. Because the display does not require being display-refreshed more than 40 times per second, the microcomputer 53 is able to use its C port to monitor the keypad 160 and control the displays 165–168 without conflict.

The microcomputer 53 employs the latch 172 at the output of its A port to control stand-alone NO CHANGE, CLOSE and OPEN LEDs and four columns of a 7-by-5 dot matrix display 176. The A port of the microcomputer 53 directly controls stand-alone RUN, HALT, MANUAL, REVIEW, PULSE AND MAINTAIN LEDs and four columns each of 7-by-5 dot matrix displays 177 and 178. The displays 176–178 are used to indicate the contact positions of the 42 circuit breakers represented by the status indicator display 92 of FIG. 5a. The three displays 176–178 are configured so that only four columns of each are used; thereby providing 28 LEDs on each part so that the 84 required displays (two per circuit breaker) are accommodated.

A variety of staple components may be used to implement the circuit illustrated in FIG, 8. For example, the latch 162 may be implemented using a 3–8 74HC137 encoder-type IC, while the latch 172 may be implemented using a 74HC373-type IC. The displays 165–168 may be implemented using a HDSPb 7503-type part, and the displays 176–178 may be implemented using a HDSP4701-type part. The RUN LED is preferably implemented using a green HLMP-1790 part, and all other stand-alone LEDs are preferably implemented using a red HLMP-1700 part. Each LED type is available from Hewlett Packard Co.

Conventionally, displays are controlled by sequentially turning on one digit or display group at a time, but repetitiously and sufficiently rapid so that all devices appear to be on simultaneously. The requisite driving current (or power) for such conventional displays is proportional to the number of segments that are turned on in each display device. Accordingly, as each display is sequentially switched, the amount of current drawn from the power supply can vary significantly. For example, no current flows if all segments are off, while the maximum current flows if all segments are on. The power supply in such conventional displays must, therefore, be able to supply the peak value of the current, even if the average value is much less.

The display design of the present invention provides a significant improvement over this deficiency of the prior art. The display on the controller 32 is preferably designed and controlled to provide a significant reduction of peak power usage. This design multiplexes the display elements by grouping segments together from different displays, rather than treating each display as a group. If the variation from minimum to maximum is kept as small as possible, the peak value of current is reduced, allowing a smaller and lower cost power supply to be used.

In accordance with the display design described above, attached hereto is an Appendix A which illustrates a table for controlling the LEDs of the display. The table includes 128 status entries defined by 16 rows and 8 columns. The entries are grouped to multiplex the display elements by grouping LED segments together from different displays to lessen power usage as described above. Preferably, two pairs of rows at a time are read by the microcomputer and written out the parallel buses to update the status of each corresponding LED. For example, the first row includes: two bits to designate the proper status of circuit breaker 16—one bit is for its OPEN LED and the second bit is for its CLOSED LED; two bits to designate the proper status of circuit breaker 15—one bit is for its OPEN LED and the second bit is for its CLOSED LED; etc. The OPEN and CLOSED LEDs are either both off or one of them is on; therefore, only three of the four states provided by each pair of circuit breaker status entries are used.

The second row of the table includes: a bit to designate the proper status of segment A of the 7-segment display 4 (D4Sa) (display 4, e.g., corresponds to display 168 of FIG. 8); a bit to designate the proper status of segment A of display 3 (D3Sa); . . . ; two bits to designate the proper status of circuit breaker 30—one bit is for its OPEN LED and the second bit is for its CLOSED LED; etc. The bottom two rows of the table include the proper status of the labeled LEDs on the display, such as Maintain, Pulse, Review, etc. Since all segments in these groups will never by on, arranging the devices in this manner results in a lower peak current for the worst-case condition.

Also within the Appendix A and below the table is a program written in MC68HC05 assembly language code which may be used as a basis for controlling the display using the table of Appendix A in the above described manner, and with the microcomputer updating the LEDs at about 40 Hertz.

Certain ones of the C port peripheral bits may be used to program and read the EEPROM 57, which may be implemented using an X24C16 type IC, and to reset the microcomputer 72 of the termination board when necessary. Also, a reset IC 174, such as an MC34164 IC, along with conventional RC timing circuitry may be used to reset and interrupt the microcomputer 53 upon power-up and when power decays during power down or due to other low voltage occurrences.

The real-time clock circuitry 58 is optional to the remaining circuitry of the controller 32 and may be used to provide time-based circuit breaker control functions. For example, the microcomputer 53 and the real-time clock circuitry 58 may be programmed by the programmer station 66 (FIG. 4) so that the real-time clock is polled by, or interrupts, the microcomputer at one or more prescribed periods to inform the microcomputer 53 that it is time to open or close a current path associated with a certain circuit breaker. In response to this type of prompt, the microcomputer 53 commands the designated circuit breaker to open or close its associated current path, provided that a command of a higher priority for the same circuit breaker was not received by the microcomputer 53 before the prompt occurred.

Commands of various priorities which may be received by the microcomputer 53 for the same circuit breaker, in addition to the aforementioned programmed prompt from the real-time clock, include a variety of commands sent through the termination board 38 (FIG. 4), commands received from the programmer station 66 (FIG. 4) and commands received from the keyboard and display 55 (FIG. 4). It is preferred that the order of priority for conflicting commands is that: commands received from the keyboard and display 55 are treated as the most important due to servicing requirements; commands received from the programmer station 66 are treated as the second most important since servicing may also be performed from the programmer station 66; commands sent through the termination board 38 are treated as the next most important; and commands prompted by the real-time clock are treated as the least important since they are likely to be representative of a previously desired mode and, therefore, requiring an override via one of the higher priority command paths.

The real-time clock circuitry 58 is preferably implemented using a 3.0 Volt Lithium battery 202 to backup an MC68HC68T1-type real-time clock IC (integrated circuit) 200. A pair of LM393A-type amplifiers 204 may be used to monitor the battery 202 by comparing the voltage level of the battery 202 to a stable reference voltage level (Vref), e.g., about 2.3 Volts, at lead 206. For additional information concerning the implementation of the real-time clock circuitry 58, reference may be made to the data sheets and application notes for the MC68HC68T1 IC, available from Motorola, Inc.

The data multiplexer 59 is used by the microcomputer 53 to route data to and from both the programmer station 66 and the gate array 60 of the interface driver board 34. Data is passed to and from the programmer station 66 using a conventional RS-232 interface circuit 61, e.g., using a LT1180-type IC, while the data passed to and from the gate array 60 is processed using an asynchronous, serial-data protocol. As depicted in FIG. 8, data is passed to and from the microcomputer 53 via its RDO and TDO ports through the data multiplexer 59, which is preferably implemented using a 74HC4052-type IC. A peripheral bit on the microcomputer 53, depicted as CHEN, is used to select (or "enable") one of two channels through the data multiplexer 59. The first channel couples the TDO and RDO ports of the microcomputer 53 with comparable ports of the gate array 60 of the termination board 38, and the second channel couples the TDO and RDO ports with the transmit and receive ports of the RS-232 interface circuit 61. Another peripheral bit on the microcomputer 53, depicted as EN, is used to enable the RS-232 interface circuit 61 so that its CTS and RTS signals are inactive when the RS-232 interface circuit 61 is not being used.

The microcomputer 53 communicates with the microcomputer 72, with the former acting as the master and the latter acting as the slave and with each microcomputer 53 and 72 employing a conventional crystal oscillator circuit 161a or 161b which drives the respective microcomputer at 3.6864 Mega-Hertz. Three of the bits from the D port of the microcomputer 53 may be respectively employed as the data transmit, data receive and synchronous clock paths for communication with the microcomputer 72 of the termination board. For example, using the MC68HC05-type microcomputers to implement the microcomputers 53 and 72, the MISO (master-in-slave-out), MOSI (master-out-slave-in), SCK (synchronous clock) and SS (slave select) microcomputer pin-outs (FIGS. 8 and 11a) provide an adequate interface. The protocol preferably includes error detection and error correction schemes to prevent erroneous messages from causing the interface driver board 34 to execute an incorrect command. For example, if an erroneous message is received by the interface driver board 34, the protocol detects the error and corrects it in a subsequent message from the controller.

Figure 9A:
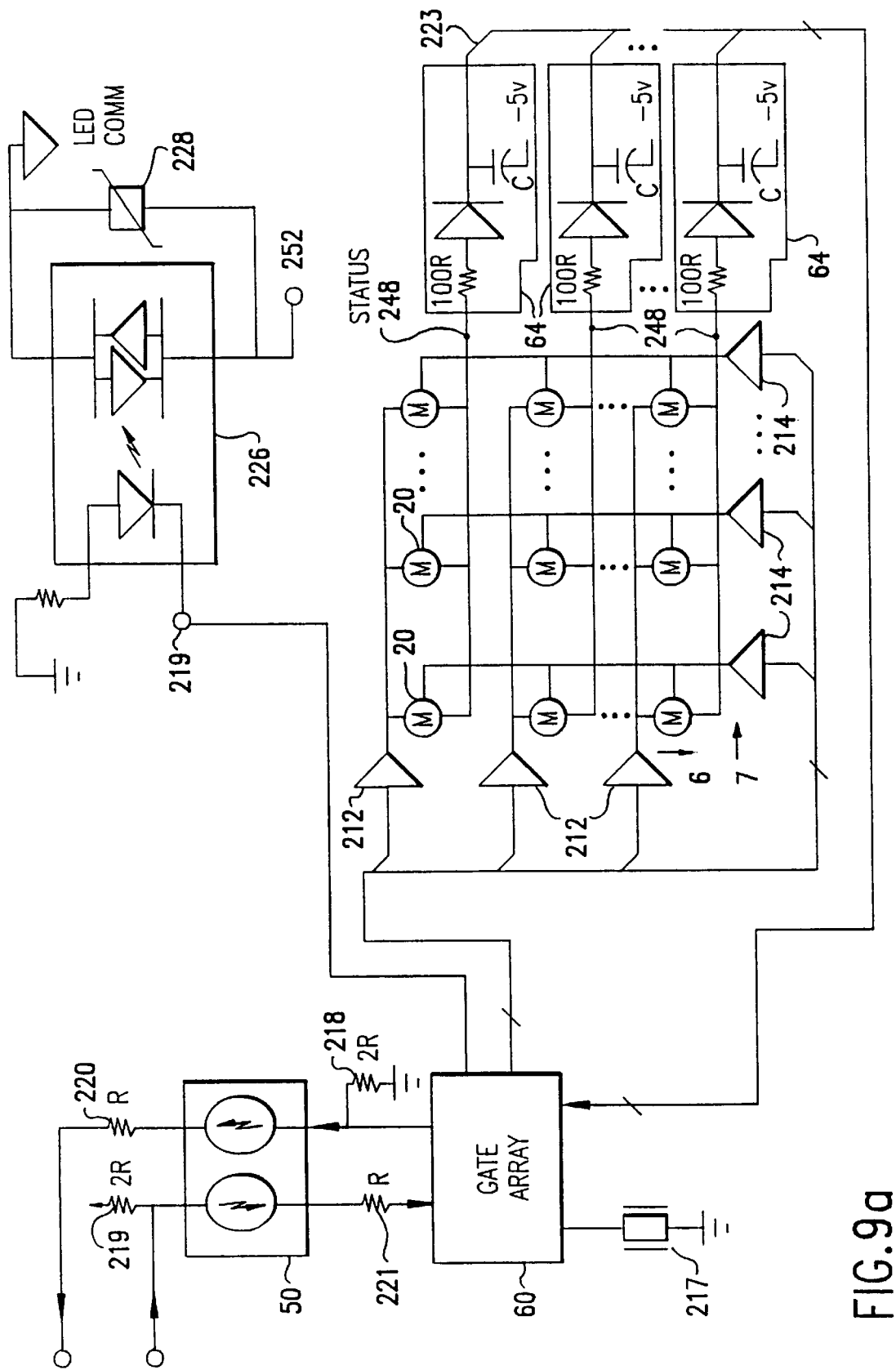
FIGS. 9a–9c comprise a schematic diagram of the interface driver board shown in FIG. 4.
Figure 9B:
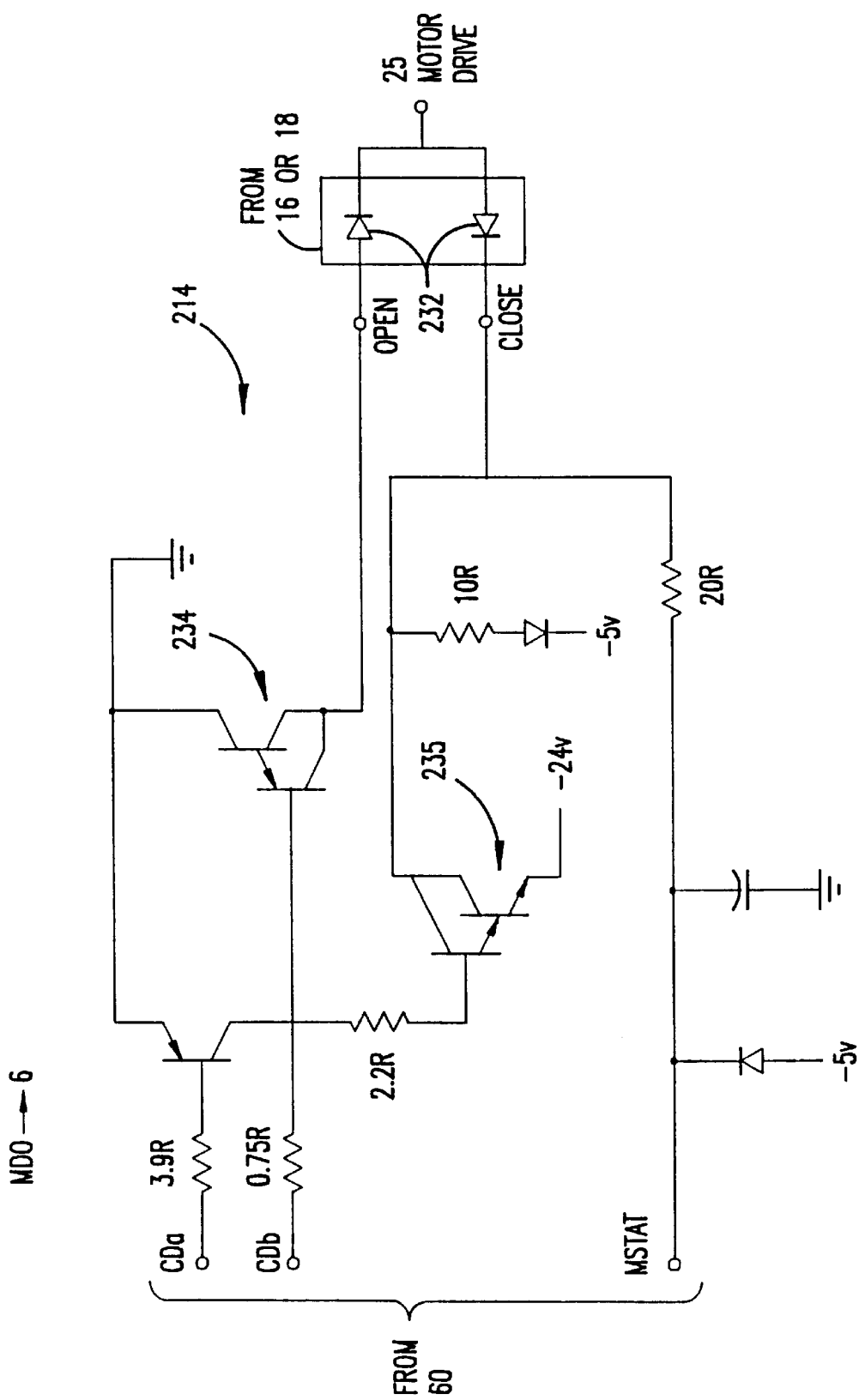
Figure 9C:
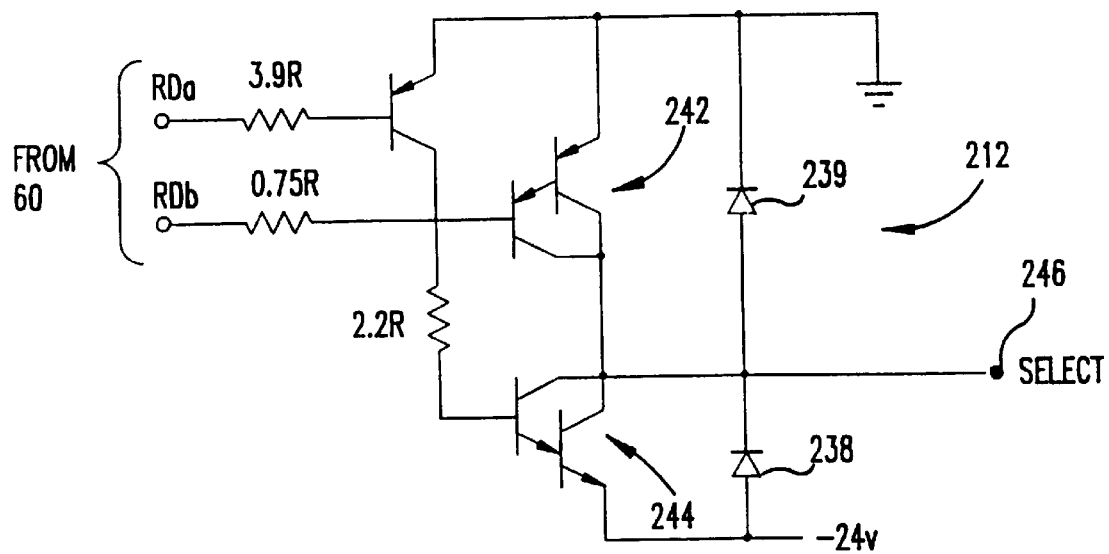

FIGS. 9a–9c illustrate the interface driver board 34 of FIG. 4 schematically. The optical isolator 50, the gate array 60 and the status filters 64 are depicted as in FIG. 4. However, the representative amplifiers 62 from FIG. 4 are shown as circuit breaker row drivers 212 and circuit breaker column drivers 214. The other elements shown will be introduced and discussed in turn.

The interface driver board also includes a conventional oscillation circuit 217 which is used to provide the appropriate clock (e.g., a 455 kHz clock) for the gate array. For further information regarding the gate array 60, reference may be made to the data sheets published and made available by ACTEL, Inc. of Sunnyvale, Calif.

The optical isolator 50 is preferably implemented using two NEC2501-1 type parts with resistors 218–221 (R=1k Ohm (FIGS. 9a–9d) providing the appropriate bias at the inputs and outputs of the optical isolator 50.

The circuit breaker row and column drivers 212 and 214 are configured seven down and six across, respectively, for controlling the motors of the forty-two circuit breakers 20 of FIG. 1a. Each row driver 212 is used to select (or enable) the circuits of six circuit breakers, while each column driver 214 is used to actuate the circuit breaker motor which is selected by the intersecting row driver 212.

Each status filter 64, which is used to report whether the contacts of the circuit breaker are open or closed, are operative when two conditions are present: the corresponding column driver 214 must select the column of circuit breakers in which the status filter 64 is associated; and the gate array 60 must actuate a triac circuit (e.g., a Siemens IL420) to provide, simultaneously, a momentary common path (LED COMM on the bus boards 16 and 18) for the input ports of the optical isolators 230 (FIG. 9d) of all forty-two of the circuit breakers 20. The gate array 60 then reads all six statuses and determines which of these statuses are to be sent to the controller 32. The circuit breaker contacts are preferably monitored using a lead 231 (FIG. 9d) connected to the load terminal of the circuit breaker 20.

A varistor 228, such as a GE-V30DLA2, is coupled across the output ports of the triac circuit 226 to provide circuit protection against voltage and current transients.

In FIG. 9b, the column driver 214 is shown as being controlled by the gate array 60 using CDa, CDb and MSTAT leads so as to drive the motor on the selected circuit breaker 20. The diodes 232 through which the motor drive signal passes are located on the bus board 16 or 18 to allow a current path through only one circuit breaker 20. The CDa and CDb signals from the gate array 60 are controlled in a polarized manner between −5 Volts and common so that if either signal is absent, the designated circuit breaker 20 cannot be commanded to open or close its contacts.

The MSTAT signal is used to indicate whether or not a motor is present. This type of status check operates in substantially the same manner as the statuses from the associated circuit breaker load, as described above. The MSTAT signal is operative when the corresponding column driver 214 selects the column of circuit breakers associated with the circuit breaker under test. The gate array 60 then reads all six MSTAT signals and determines which of these signals are to be sent to the controller 32.

In FIG. 9c, the row driver 212 is shown as being controlled by the gate array 60 using RDa and RDb leads so as to select the appropriate row of circuit breakers 20. The diodes 238 and 239 are used to mitigate the effect of transient signals received from the bus boards 16 and 18.

Figure 9D:
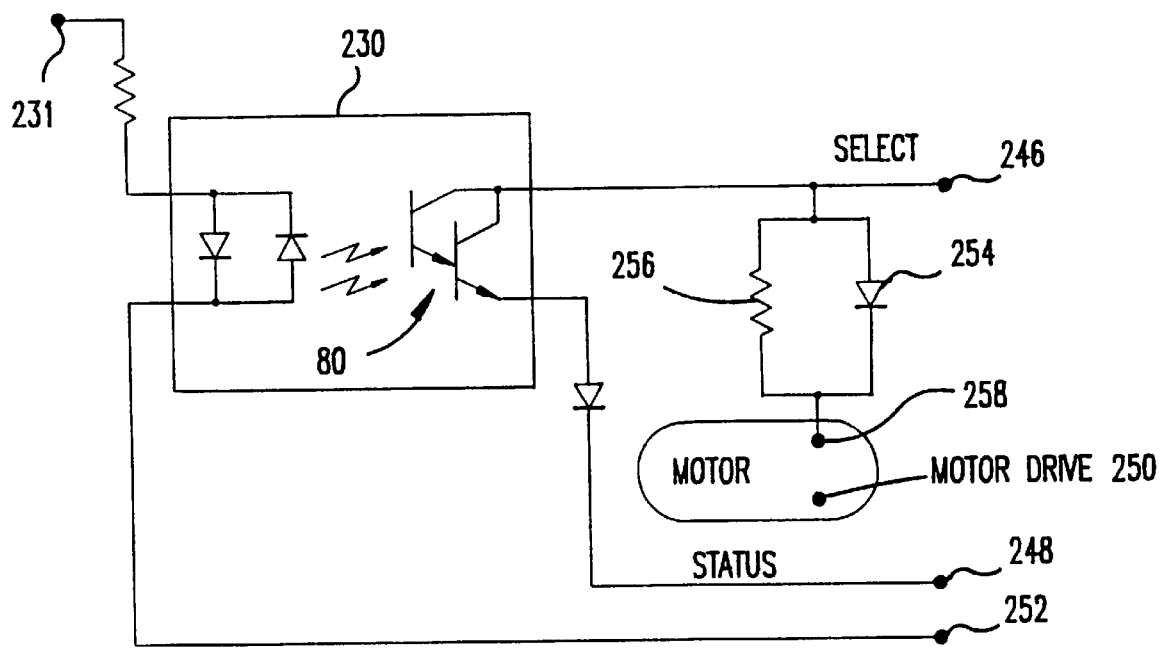

FIG. 9d, which illustrates the electrical control portion of the preferred remote control circuit breaker 20, depicts four leads carried by each plug-in connector 22 of the bus boards 16 and 18. They include: the select lead 246, status lead 248, motor drive lead 250 and an isolator enable lead 252; the signals of each lead performing the previously described functions.

A parallel resistor/diode arrangement 254/256 serves two functions. The diode 254 may be used to provide current flow in a unilateral direction, while the resistor 256 is used to control the power provided from lead 258 to the motor of the circuit breaker 20. The value of the resistor 256 is selected according to the necessary current specified to operate the motor. In the event that the lead 258 is used to control a plurality of poles, e.g., for controlling two or three circuit breaker poles, the resistance required will vary. For single pole operation by the FK130S-10300 Mabuchi motor exemplified in the above referenced copending application, the value of the resistor 256 is preferably 12 Ohms.

Figure 9E:
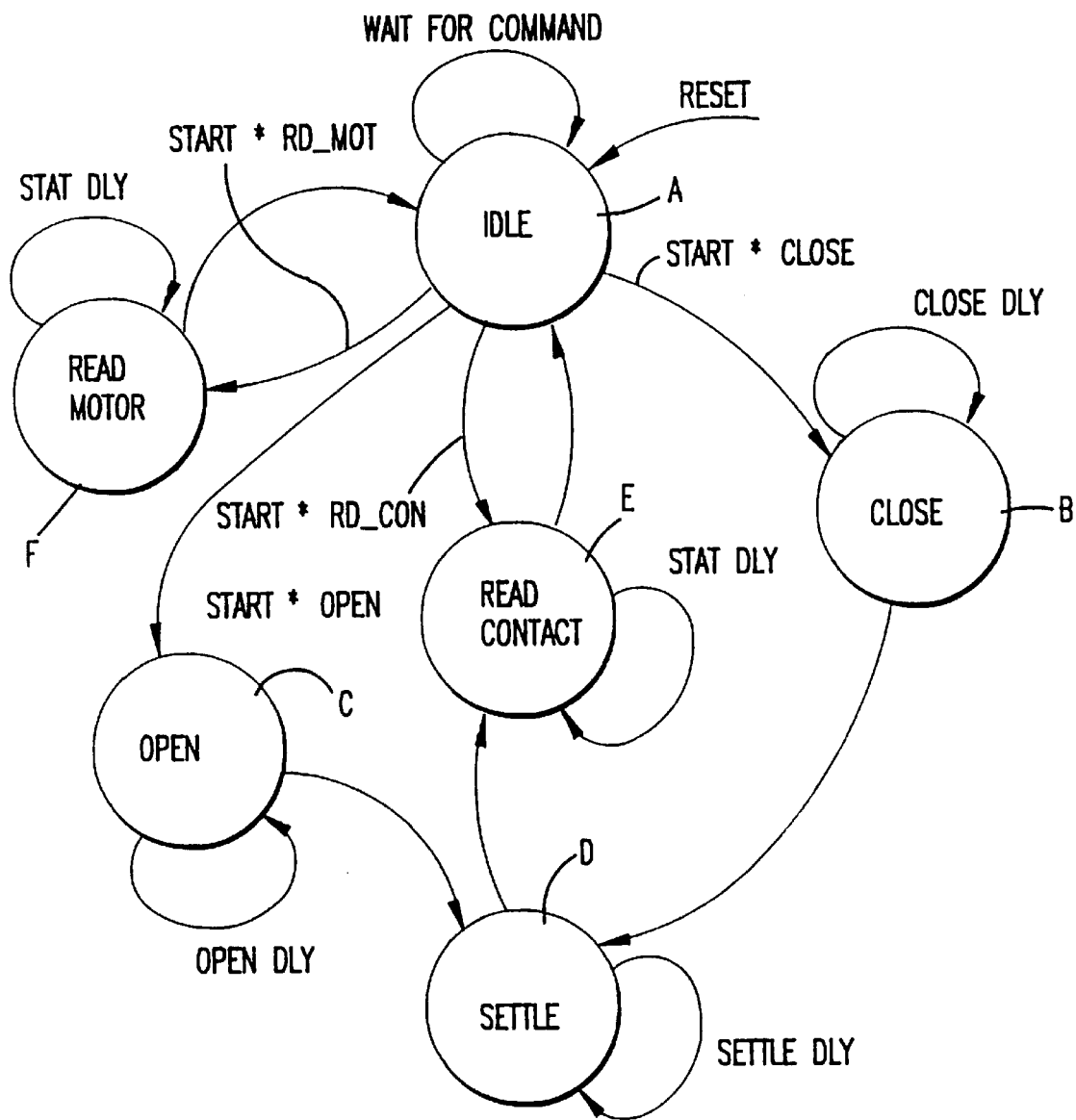

FIG. 9e is a state diagram which depicts the power driver operation of the gate array illustrated in FIG. 9a. The diagram includes six states, depicted A–F. Beginning at state A, the gate array waits for a command from the controller.

The command may be one of four commands: a close contacts command which instructs a particular circuit breaker to close its contacts, depicted by the sequence of states A-B-D-E-A; an open contacts command which instructs a particular circuit breaker to open its contacts, depicted by the sequence of states A-C-D-E-A; a read contacts command to determine if a particular circuit breaker's contacts are closed or open, depicted by the sequence of states A-E-A; and a read motor command to determine if the motor is present, depicted by the sequence of states A-F-A. The state delay associated with state D is to allow the contacts sufficient time to settle before reading the status of the contacts at state E. The state delays associated with states B and C are to allow the contacts sufficient time to react before commencing the settling-time delay of state D. The state delays associated with states E and F are to provide the gate array with the appropriate timing response before reporting to the controller with the requested status.

Figure 9F:
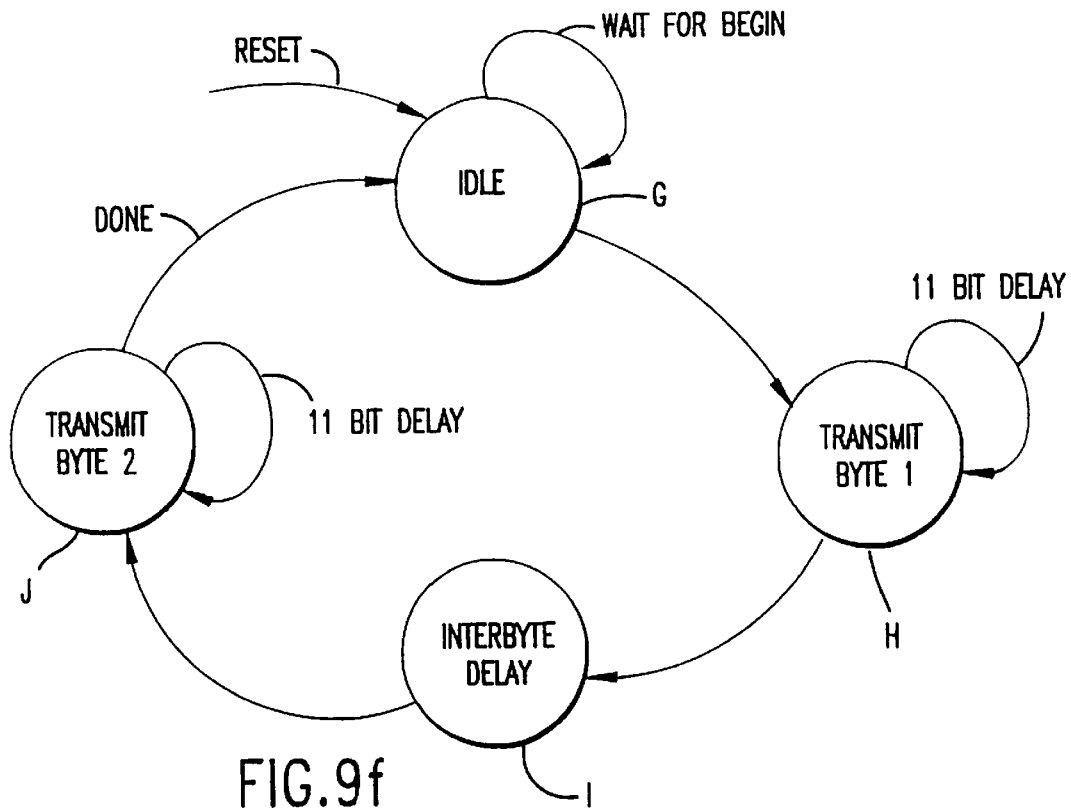

FIG. 9f depicts the message transmit operation of the gate array illustrated in FIG. 9a in state diagram form. The diagram includes four states, depicted G–J. Beginning at state G, the gate array waits for flow from states E and F for transmitting a contact status or motor status response. Once received, flow proceeds to block H where the first of the two bytes is transmitted. Since each byte consists of a start bit, 8 data bits, a stop bit and a parity bit, an 11 bit delay is illustrated. From state H, flow proceeds to state I where the gate array waits for prescribed interbyte delay before moving to state J. At state J, the second of the two bytes is transmitted, and, after the 11 bit delay, the transmission is complete.

Figure 9G:
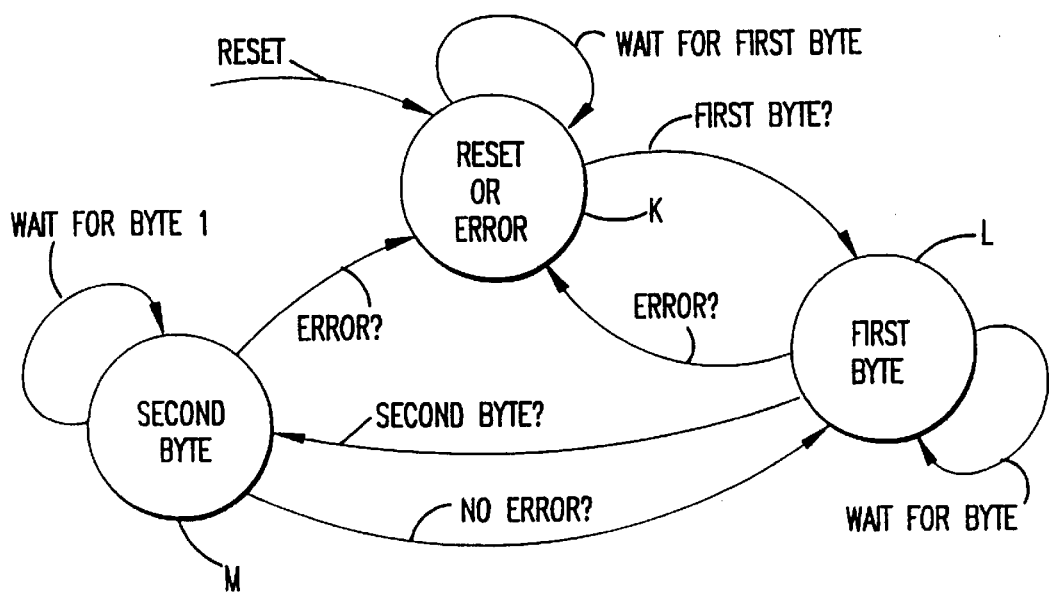

FIG. 9g depicts the message receive operation of the gate array illustrated in FIG. 9a in state diagram form. The diagram includes states K, L and M. Beginning at state K, the gate array is reset and flow proceeds to state L to wait for reception of the first byte of the two-byte message from the controller. If the first byte is received with an error, flow returns to state K for corrective action (e.g., a reset and a communication to the controller that an error occurred). Once the first byte is received, flow proceeds to state M where the gate array waits for the second of the two bytes. Once the second byte is received, the gate array determines whether or not the second byte was received with an error. If the second byte is received with an error, flow returns to state K once again for corrective action. Otherwise, the reception of the second byte completes the reception mode for a two-byte message and flow returns to state L.

The gate array 60 is preferably implemented using an ACTEL A1020APL84I-type gate array which is fused according to the information attached hereto in Appendix B, which includes parts I–IV. Part I is the fuse file, which constitutes the main input to the ACTEL fusing program for the subject part. To save space, the file is presented with seven parallel columns of fusing data, which is read top to bottom/left to right. To actually use the file, the seven columns of data on each page must be converted to a single column on the far left of the page. Part II is a definition file which is also required to program the subject ACTEL device. Part III is a gate array pin list which is also presented to the ACTEL fusing program so that the program can determine which pins correspond to which device circuits. The parenthetical comments to the right of the PIN numbers may be used to correlate the listed PIN numbers to the schematics of FIGS. 9a, 9b and 9c.

Part IV consists of four sheets of commands sent from the controller and proper responses from the gate array. The first sheet includes 42 commands which may be used to instruct each of the 42 circuit breakers to report as to whether or not a motor (or circuit breaker) is present in the load center. The second sheet includes 42 commands which may be used to instruct each of the 42 circuit breakers to report as to whether the associated circuit breaker contacts are open or closed. The third sheet includes 42 commands which may be used to instruct each of the 42 circuit breakers to open the associated contacts; the response by the gate array is one which indicates whether the contacts are open or closed after the controller command is executed. The fourth sheet includes 42 commands which may be used to instruct each of the 42 circuit breakers to close the associated contacts; the response is similar to that for the open command in that the gate array indicates whether the contacts are open or closed after the controller command is executed.

FIGS. 9h–9k comprise a series of timing diagrams which respectively depict the receive message, open contacts, read status and read motor timing operations of the gate array. There are fourteen signals shown in the figures.: RCV is the receive signal (and gate array pin) which is used by the gate array to receive a two byte message from the controller; ENABLE SAMPLE is an internal signal to the gate array which tracks the timing for receive data sent between the controller and the gate array; XMIT is the send signal (and gate array pin) which is used by the gate array to transmit a two byte message to the controller; DRVTRIAC corresponds to the isolator enable lead 252 and is an active low signal (and gate array pin) which is used to drive the triac circuit 226 when the gate array is preparing for a status read; DRVCOND corresponds to the signal 219 of FIG. 9A and is driven low when the status is not actually being read—when this signal is low, the status filters drive the inputs to the gate array; PSEL#-DRV and NSEL#-DRV are active low signals which are respectively used to drive the select or row drivers 212 during status/motor read and open command execution (where # designates one of the six rows); PMOT#-DRV and NMOT#-DRV are active low signals which are respectively used to drive the PNP and NPN motor or column drivers 214 during open command execution and close command execution (where # designates one of the seven columns); PS represents the combination of all PNP select or row power transistor drivers 212; NS represents the combination of all NPN select or row power transistor drivers 212; PM represents the combination of all PNP motor or column power transistor drivers 214; and NM represents the combination of all NPN motor or column power transistor drivers 214. The PS, NS, PM AND NM are denoted in hexidecimal form in each of the diagrams.

Figure 9H:
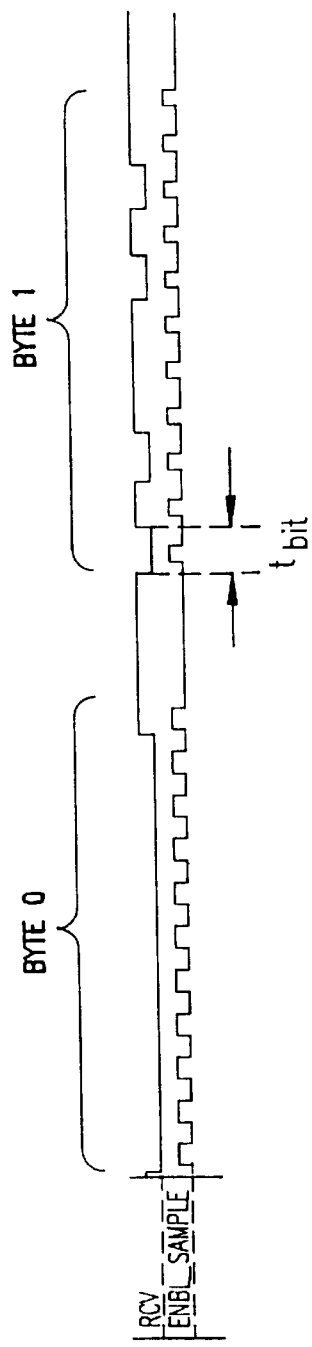

FIG. 9h illustrates byte 0 and byte 1 being received by the gate array from left to right, with the least significant bit being on the left and the most significant bit being on the right. The enable sample signal being high indicates when the gate array latches in a bit from the receive signal. The bit definitions for each byte are the same. Each includes an active low start bit, a byte number bit (0 for byte 0 and 1 for byte 1), four data bits for the message, three check bits for detecting communication errors, a parity bit and an active high stop bit. The notation $t_{bit}$ represents 1/1200 second bit width for a 1200 baud rate transmission.

Figure 9I:
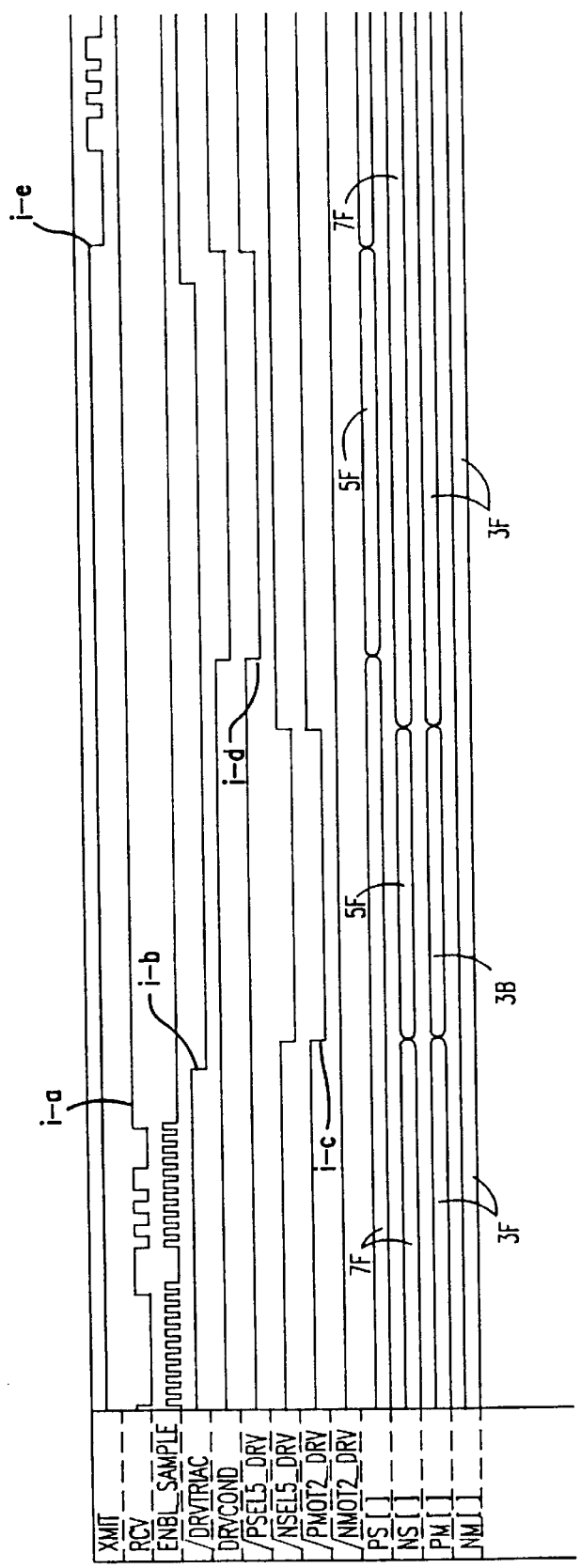
Figure 9:
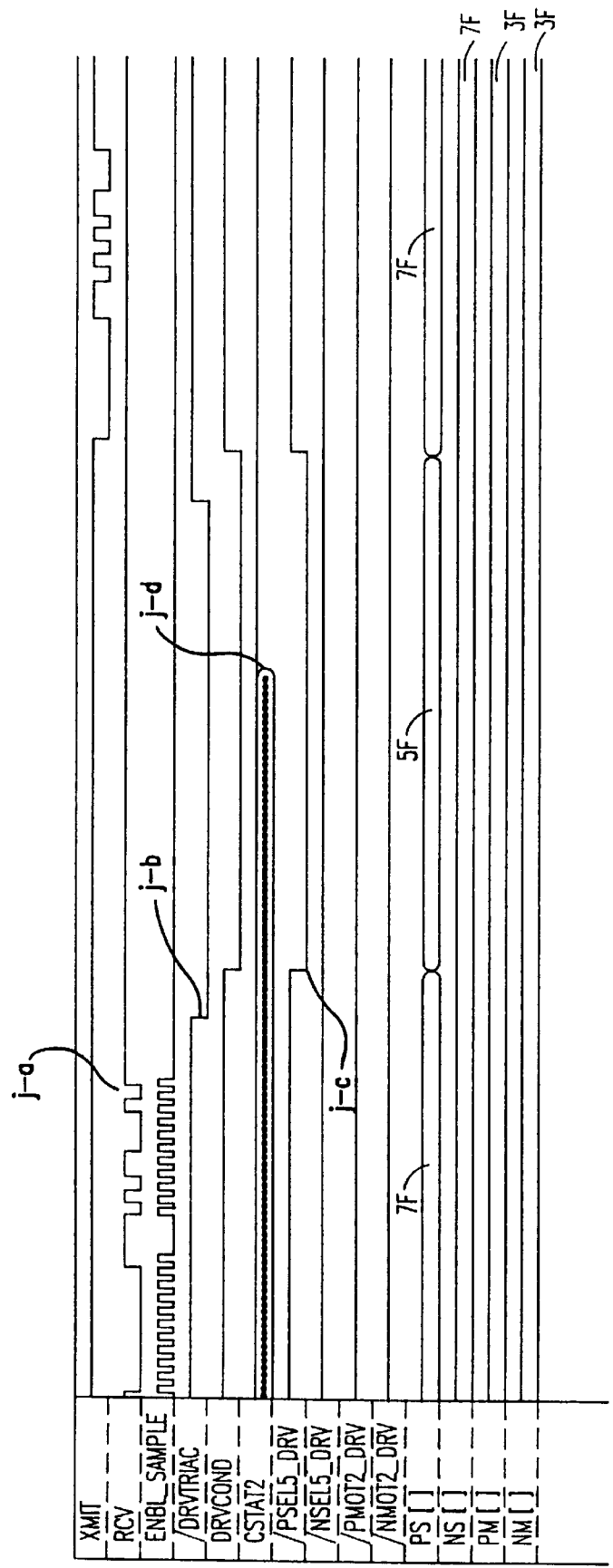

FIG. 9i illustrates the gate array timing when an open contacts command is being received and executed. At point i-a of the diagram, the two byte message or command is received by the gate array. At point i-b, the triac is enabled, and at point i-c the particular column and row drivers for the designated circuit breaker are enabled to open the circuit breaker contacts. The hexidecimal representation of NS and PM (5F and 3B) reflect one bit of the row drivers and one bit of the column drivers being low so as to select the correct circuit breaker from the circuit breaker array. At point i-d, the gate array prepares to read the status of the circuit breaker contacts, and at point i-e the gate array begins reporting the status of the circuit breaker contacts to the controller.

FIG. 9j illustrates the gate array timing when a read status command is being received and executed. At point j-a of the diagram, the two byte message or command is received by the gate array. At point j-b, the triac is enabled, and at point j-c the particular column driver for the designated circuit breaker is enabled to allow the CSTAT signal to read the selected filter. At point j-d, the gate array begins reading the status of the circuit breaker contacts, and at point j-e the gate array begins reporting the status of the circuit breaker contacts to the controller.

Figure 9K:
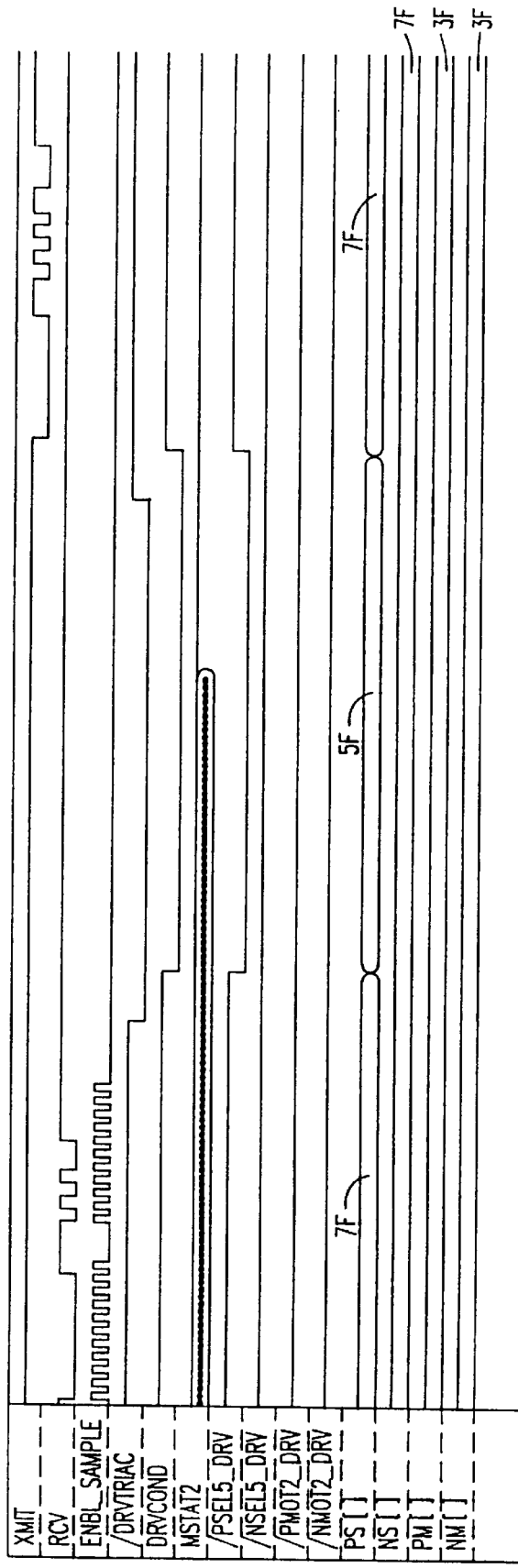

FIG. 9k illustrates the gate array timing when a motor read command is being received and executed. The only substantive difference between the signal transitions of the diagrams FIGS. 9j and 9k is MSTAT is used in place of CSTAT.

Figure 10A:
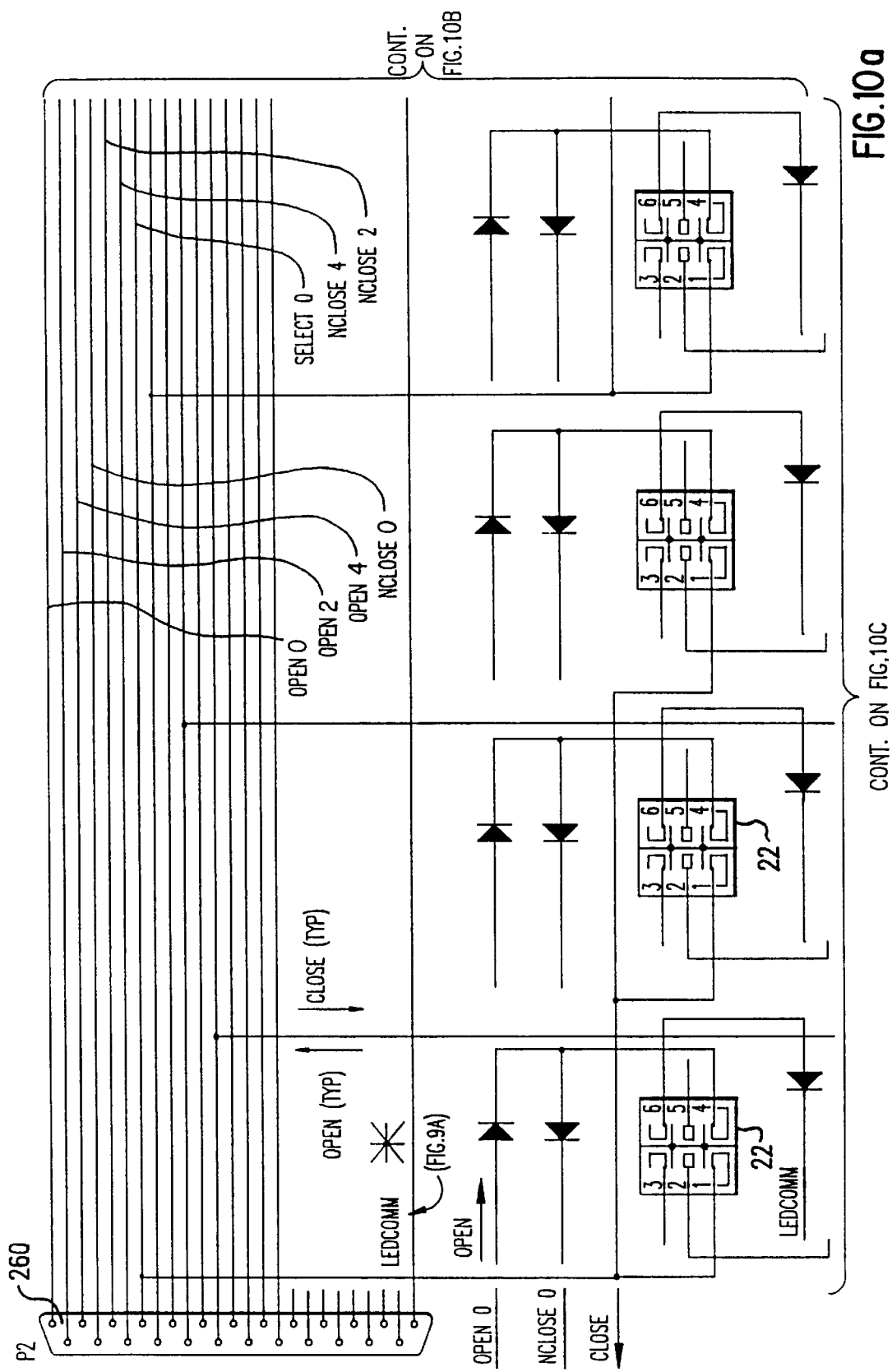
Figure 10B:
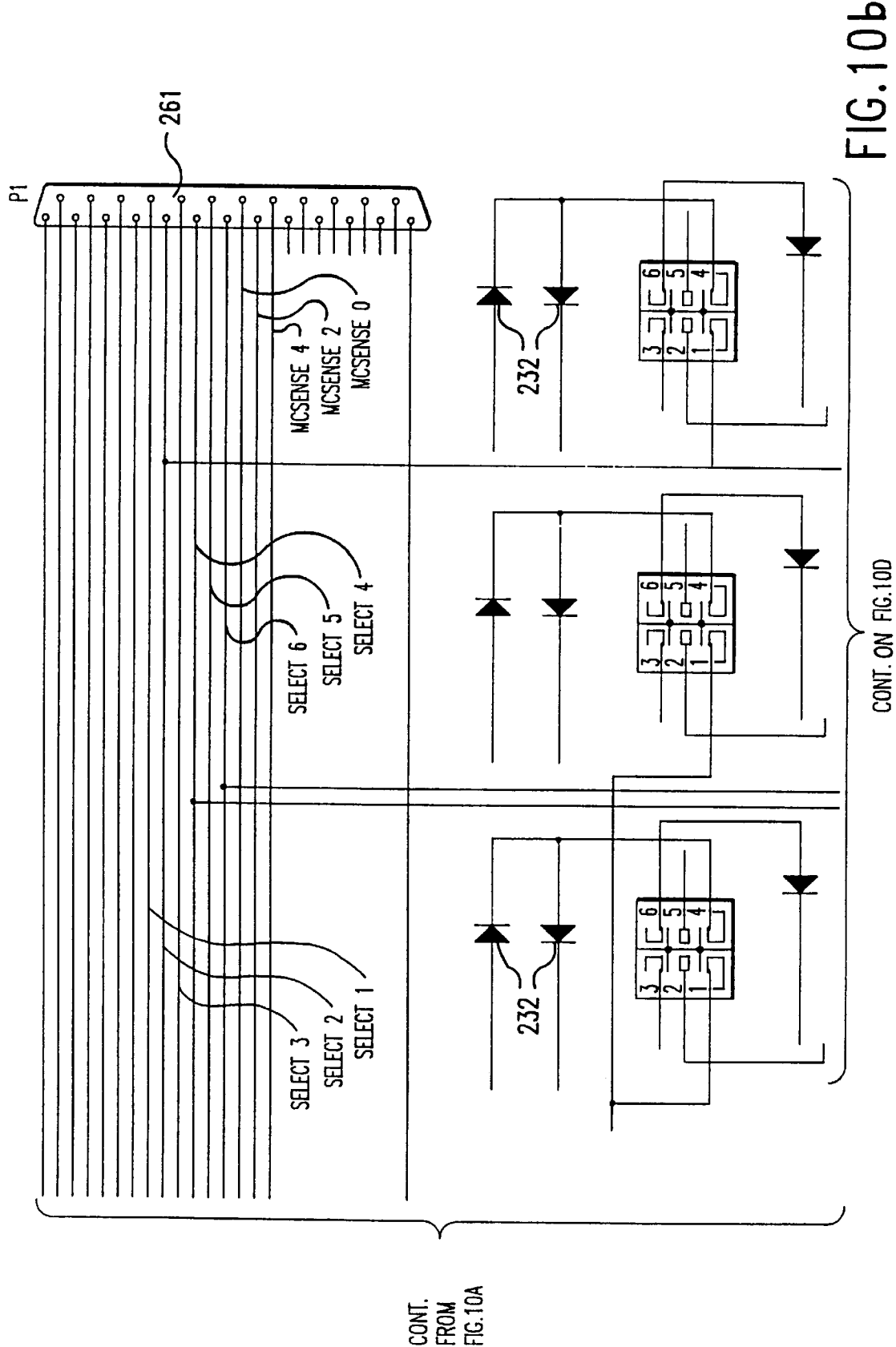

FIG. 10 illustrates one of the identical bus boards 16 and 18 of FIG. 4 from a schematic perspective. Shown are twenty-one connectors 22 for each of the twenty-one remote control circuit breakers 20. Each connector 22 carries each of the four signals (the select lead 246, status lead 248, motor drive lead 250 and the isolator common lead 252) between the interface driver board 34 and the circuit breaker 20. The diodes 232 are also illustrated and discussed in connection with the circuit in FIG. 9b. The connectors 260 or 261 may be used to connect the bus board 16 or 18 with the interface driver board 34 at either the top or the bottom, respectively, of the load center 10. The diodes 232 are used to provide current blocking so that only one motor can be selected at a time, and the diode 262 is used to provide current blocking so that all the current must flow through the opto triac circuit 226, rather than through the other various available paths.

Figure 11A:
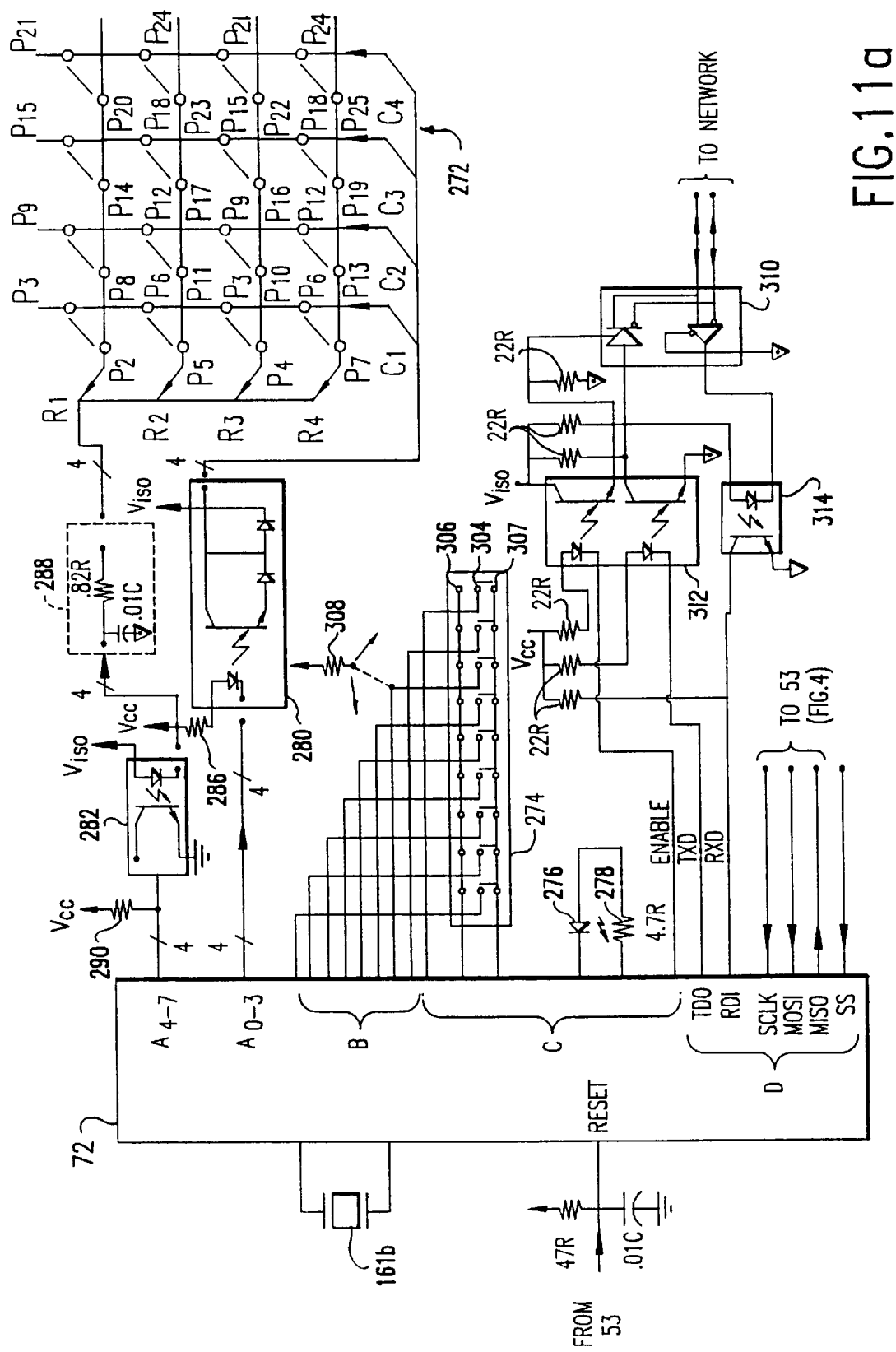
FIGS. 11a–11d represent various implementations of the termination board shown in FIG. 2 from a schematic perspective.
Figures 11B, 11C:
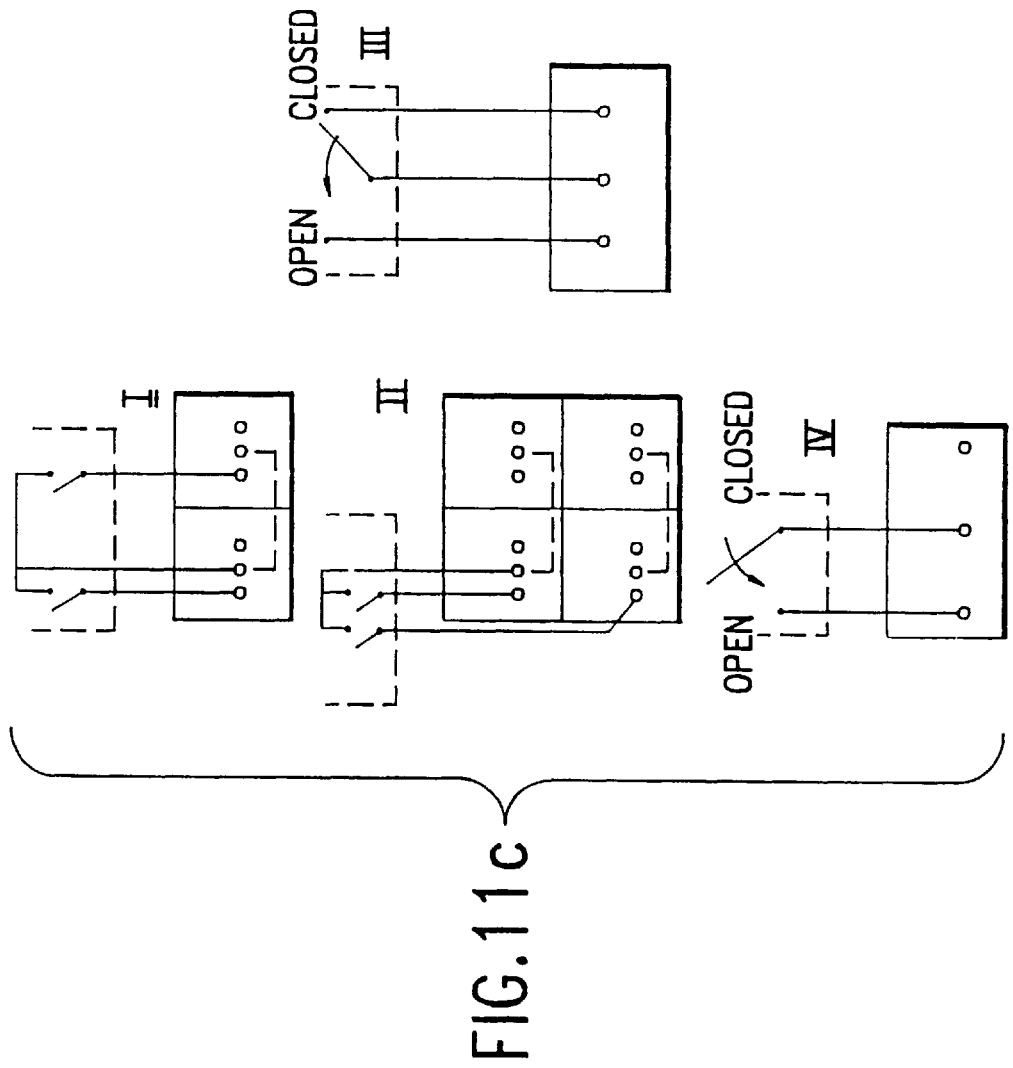

FIGS. 11a–11d represent various aspects of the termination board 38 in considerably more detail than FIG. 4. FIG. 11a, by itself, illustrates each of the components of the termination board 38 in schematic form, except for certain matrix circuitry 272 which is shown schematically in FIG. 11d. FIGS. 11b and 11c illustrate terminal blocks 270 (implementing the input terminals 54 of FIG. 4), which may be used for connecting dry-contact switches or relays to the termination board 38.

The microcomputer 72 of FIG. 11a, which may be implemented using the same type of IC as that used for the microcomputer 53 of FIG. 8, controls the termination board using ports A, B and C, along with certain designated bits from the D port for serial communication. The A port is used to scan or read the terminal blocks 270 (illustrated as part of the matrix circuitry 272) in a highly efficient manner, as will be discussed. The B port and the first three bits of the C port are used to read a set of nine trinary DIP switches 274. The C port may also be used for controlling a multicolor LED 276, via resistor 278, to provide diagnostic-related information regarding the operation of the termination board.

The matrix circuitry 272 is optically isolated from the remainder of the termination board 38 using a pair of quad NEC PS2501-4 ICs, opto-couplers 280 and 282, so as to isolate Vcc (and its common) from Viso (and its common) to protect the termination board circuitry from induced electrical noise received from the remote control devices connected to the terminal blocks 272 and to block the radiation of noise into the wiring. The A port bits A:0–3 are individually received at the anode side of the four inputs of the opto-coupler 280 and coupled past a pair of transient protecting diodes 284 to provide four optically isolated control bits C1 through C4, which are used to drive four columns of the matrix circuitry 272. The cathode side of each of the four inputs of the opto-coupler 280 is preferably connected to Vcc (+5 Volts) through a 820 Ohm pull-up resistor.

Four rows of the matrix circuitry 272 are read by the A port bits A:4–7 via four optically isolated control bits R1 through R4. Each of the control bits R1 through R4 is individually received at the collector side of an associated one of the four outputs of the opto-coupler 282 and coupled from a low pass filter circuit 288, which removes high frequency noise. From the low pass filter circuit 288, each control bit R1 through R4 is received at the anode side of a respective one of the four inputs of the opto-coupler 282, which couples R1 through R4 to the A port bits A:0–3. Each of the collector outputs of the opto-coupler 282 are pulled to Vcc via 1k Ohm resistors 290.

In the matrix circuitry 272, C1 through C4, which are normally at a logic high, are alternately set low (0 Volts) while the microcomputer 72 scans each of R1 through R4 for each C1 through C4. If any switch input, e.g., defined by P2–P3 in the upper left corner of the matrix circuitry 272, is shorted, the microcomputer 72 is then able to detect that short by scanning R1 through R4.

Figure 11D:
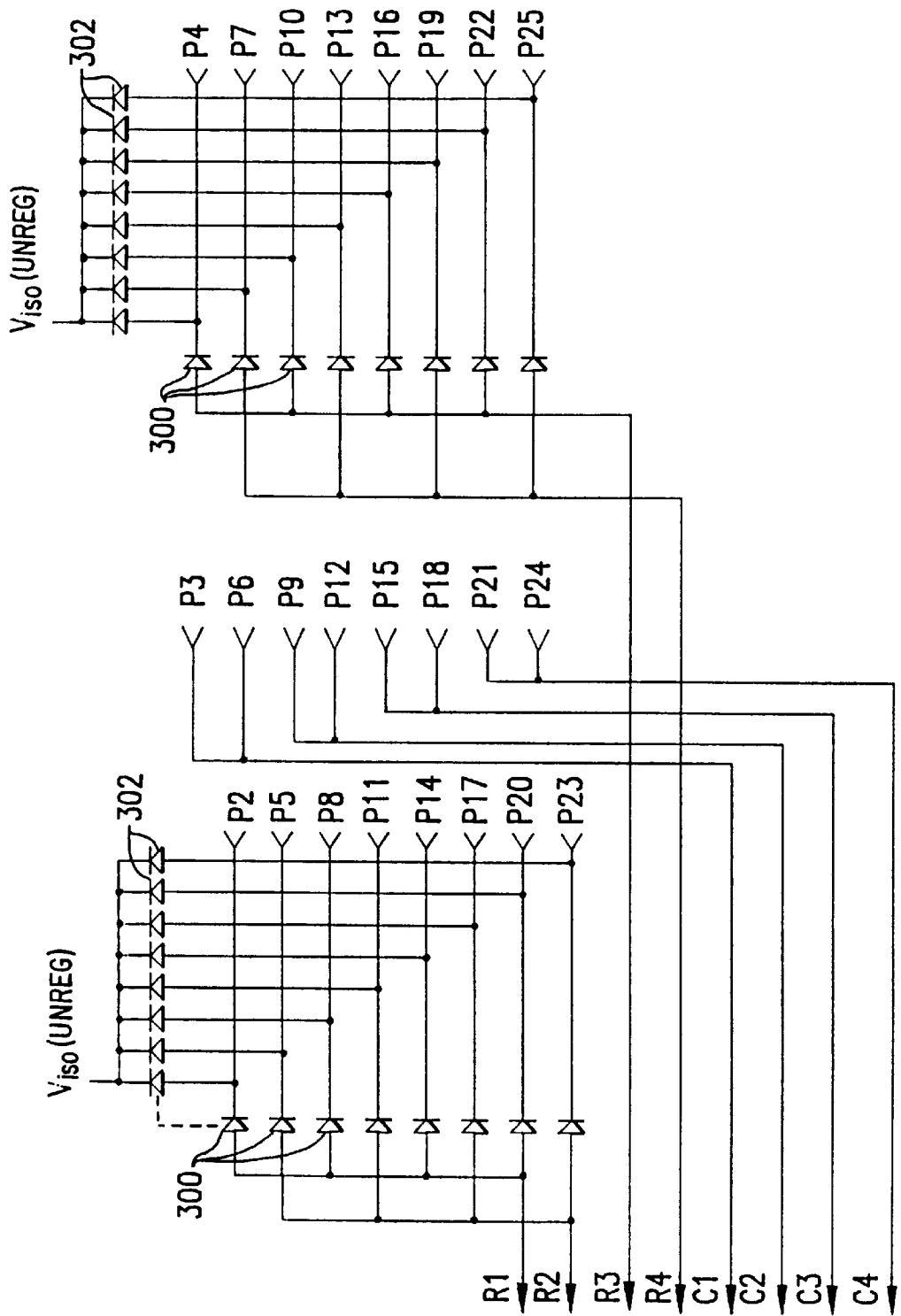

FIG. 11d illustrates the matrix circuitry 272 schematically, with each of the switch pairs (e.g., P2–P3, P8–P9, P17–P18, etc.) shown separated out for illustrative purposes. The diodes 300 are selectively placed to prevent the microcomputer 72 from falsely determining that one of the switch inputs is in the shorted state. Without the diodes 300, such a condition could occur if, for example, the adjacent three switch inputs (forming a square in the matrix) were each shorted simultaneously. The diodes 302 are used to provide transient protection.

FIG. 11b illustrates a preferred manner of arranging the switch inputs, each of which is labeled with a circle around the respective number 1–8, such that a three-wire signal, having positive, common and negative (as previously discussed), may be received by each of the switch inputs to control one, or a set, of the circuit breakers 20. The terminals of each switch input, e.g., P2, P3 and P4, are designated in FIG. 11b to indicate the corresponding switch input in FIGS. 11a and 11d.

FIG. 11c is used to illustrate the proper manner of connecting the signal wires to the switch inputs. Embodiment III illustrates a preferred way of wiring a three-wire pulsed (momentary) or maintained signal at a single one of the eight switch inputs, while embodiment IV illustrates a preferred way of wiring a two-wire maintained signal at a single one of the eight switch inputs. The embodiments depicted I and II respectively illustrate an acceptable manner of connecting two two-wire signals and an unacceptable manner of connecting a three-wire signal (or two two-wire signals) to the switch inputs. In order to avoid false switching or undetected switching, no three-wire signals should be connected across vertical terminal blocks 270; thus, embodiment I is proper and embodiment II is improper. The dotted lines in each terminal block depict a shared common between the wire terminals, and each terminal block includes only three wires terminals for a total of 24 possible wire terminals.

Eight of the nine trinary DIP switches 274 are used to program the microcomputer 72 for the kind of remote control signal (e.g., pulsed or maintained) which is to be received at each of eight input terminals (FIGS. 11b and 11c), as previously discussed. As an alternative, the function of the first eight trinary DIP switches 274 may be implemented by programming the microcomputer 72 through the controller 32 (e.g., via the programmer station 66) or through one of the input terminals (assuming that the microcomputer 72 has a known default mode for receiving this information). The remaining one of the trinary switches 274 is used to program the microcomputer 72 for the network configuration. For example, each of the three positions of the remaining trinary switch can be used to indicate point-to-point, multidrop (e.g., RS485-type) and a disable network communication mode, respectively.

Each of the trinary DIP switches 274 is read by the microcomputer 72 by scanning the center terminal 304 of the switches 274, while, alternately, driving a logic low on each outside terminal 306 or 307. By pulling up to Vcc each of the center terminals 304 using pull-up resistors 308, the microcomputer 72 is able to determine the position of each trinary switch 274.

As previously discussed in connection with the microcomputer 53 of FIG. 8, the SCLK, MOSI, MISO and SS ports of the microcomputer 72 are directly connected with the corresponding ports of the microcomputer 53 of FIG. 8 to provide synchronous serial communication therebetween. Although not shown, a pair of diodes may be situated on each of the lines emanating from the SCLK, MOSI, MISO and SS ports to provide protection from both high and low level power transients.

The network drivers 68 of FIG. 4 are preferably implemented using an LTC-485 type IC 310, which is optically isolated from the microcomputer-related circuitry using NEC PS2501 type opto-couplers. The purpose of the optical isolation is to eliminate noise and ground-loop related problems. This conventional arrangement may include transient-resistant diodes to provide reliable and efficient RS485 type network capabilities for the system.

Figure 12D:
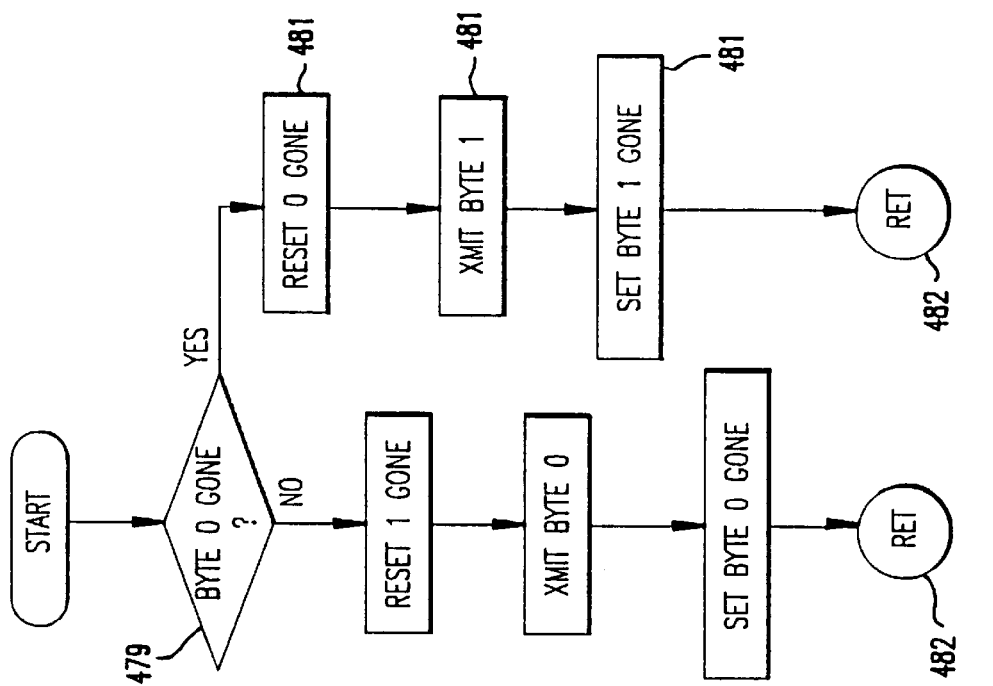
FIGS. 12a–12d comprise a flow chart which may be used to program the microcomputer shown in FIG. 8.
Figure 12A:
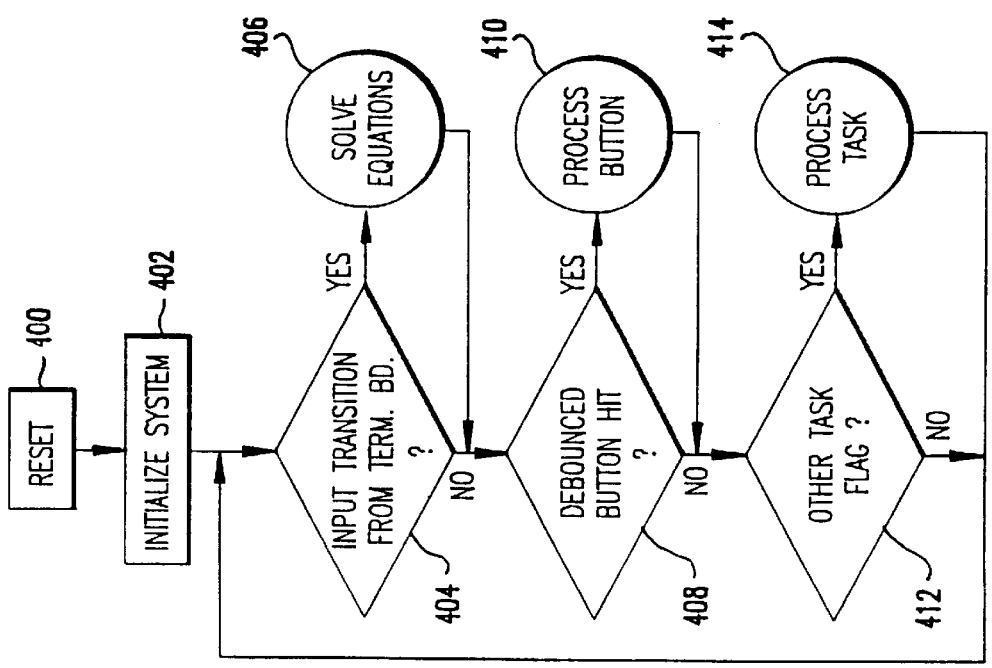

FIG. 12a illustrates a preferred flow chart which may be used to implement the operating program for the microcomputer of the controller 32 of FIG. 4. The flow chart begins at blocks 400 and 402 where the microcomputer is depicted transitioning from the reset to system initialization stage. At block 404, a test is performed to determine if any signal transitions have been detected at the input terminals of the termination board. As previously discussed, any such signal transitions are interpreted by the termination board 38 and passed to the microcomputer of the controller 32 via the synchronous link. Once the microcomputer of the controller 32 receives notification of such a signal transition, flow proceeds from block 404 to block 406 where the microcomputer determines which circuit breakers are associated with the signal transition and which tasks must be scheduled in accordance with the signal transition. From block 406, or if no signal transition was detected at block 404, flow proceeds to block 408.

Figure 12B:
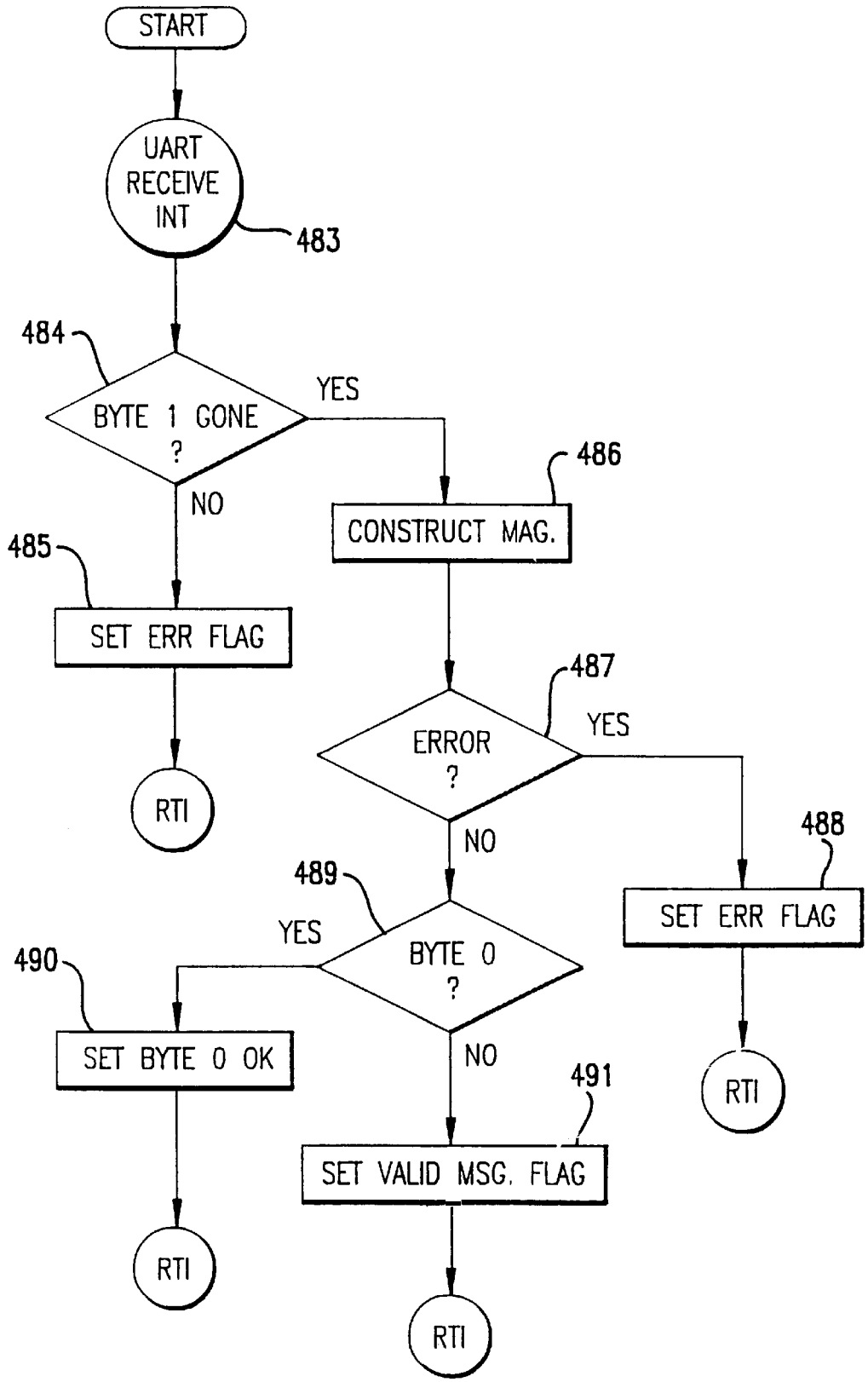
Figure 12C:
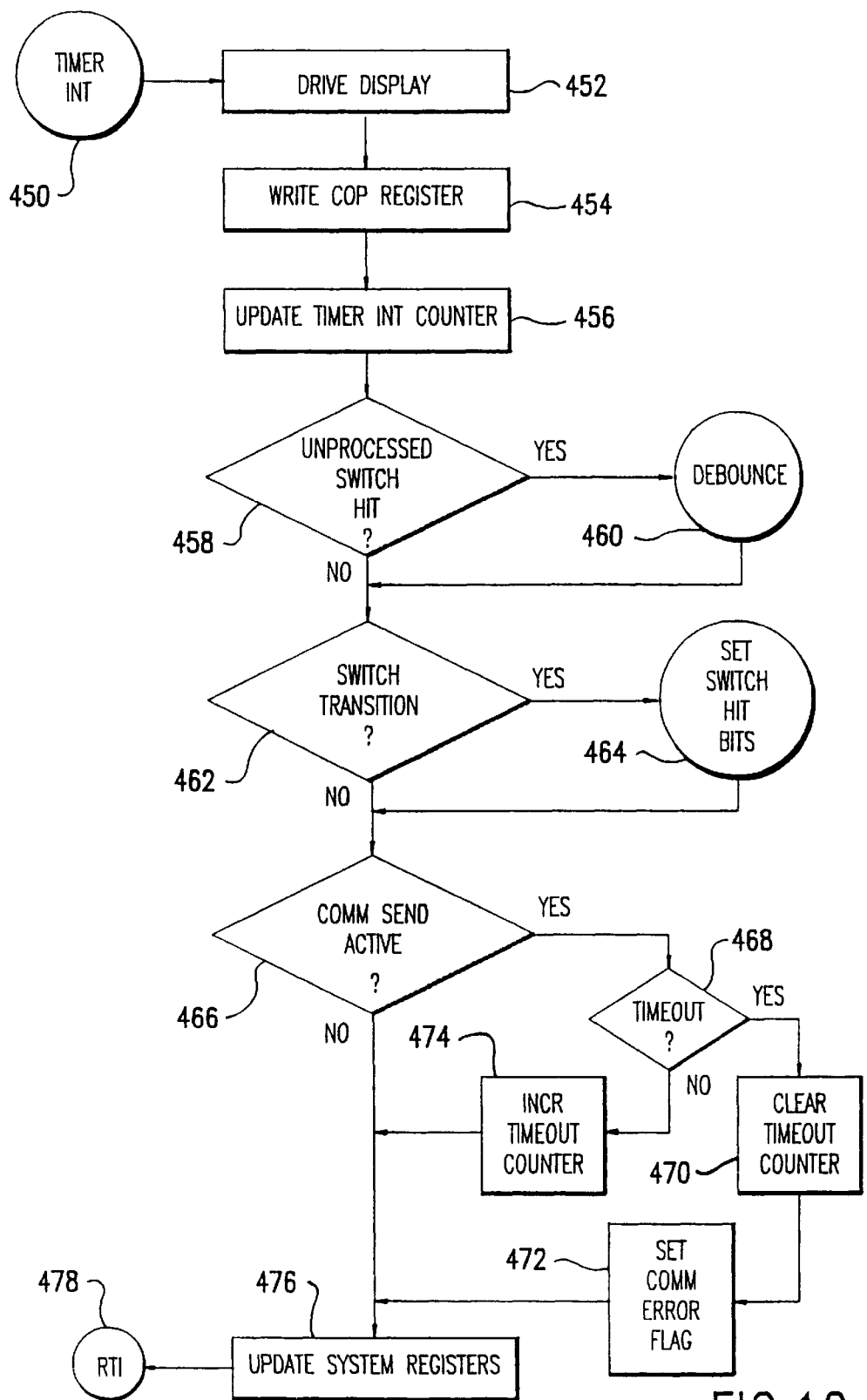

At block 408, the microcomputer performs a test to determine if any manual inputs have been received and debounced via the timer interrupt routine of FIG. 12c. In response to the reception of such an input, flow proceeds from block 408 to block 410 where the requisite tasks associated with that input are processed. From block 410, or if no manual input was received at block 408, flow proceeds to blocks 412 and 414 where the microcomputer performs any tasks which have been scheduled for execution; for example, such a task would include any automatic action to be taken as a result of a prompt from the real time clock. From blocks 412 and 414, flow returns to block 404 for additional monitoring of the signal inputs at the termination board and the manual inputs at the front panel of the controller 32.

FIG. 12b illustrates a preferred manner of receiving the two-byte message from the gate array. The flow chart begins at block 483 where the microcomputer receives a byte via an interrupt. At block 484, the microcomputer determines if the second byte (byte 1) has been sent to the gate array for a proper response. If not, flow proceeds to block 485 where the microcomputer sets a flag indicating an error (e.g., both bytes must be transmitted before a valid response can be received) and that corrective action needs to be taken. Otherwise, flow proceeds to block 486 where the microcomputer constructs and interprets the received message from the gate array. At block 487, the microcomputer checks for errors. If an erroneous response was received, flow proceeds to block 488 where an appropriate error flag is set for subsequent action. Otherwise, flow proceeds to block 489 where the microcomputer determines whether byte 0 or byte 1 has been received. If byte 0 was received, a flag is set (block 490) to indicate that another byte is forthcoming. If byte 1 was received, a flag is set (block 491) to indicate that a valid message was received and, if needed, further action taken. From blocks 485, 488, 490 and 491, a return from interrupt command is executed.

FIG. 12c illustrates a flow chart which may be used to implement a timer interrupt routine for the microcomputer 32. This routine services, upon the receipt of the timer interrupt, various inputs to the controller including the switches on its front panel. The routine starts at block 450 where the microcomputer of the controller is depicted being interrupted from its normal flow. From block 450, flow proceeds to block 452 where the microcontroller updates the display as previously described. At block 454, the microcomputer refreshes its internal COP (computer operating properly) register to prevent a reset from occurring. Block 456 depicts the microcomputer presetting the counter which is used to generate the next timer interrupt.

From block 456, flow proceeds to block 458 where the microcomputer performs a test to determine if there are any switch inputs at the front panel of the controller that have to be processed. If there are any switch inputs that have to be processed, flow proceeds from block 458 to block 460 where the microcomputer debounces the next unprocessed switch input. Any such manual input is preferably debounced using conventional software debouncing steps. If there are no switch inputs that have to be processed, or from block 460, flow proceeds to block 462.

At block 462, the microcomputer performs a test to detect switch transitions caused by manual inputs at the front panel. If such transitions have occurred, flow proceeds to block 464 where flags (bits) are set to record which switches have been selected. Otherwise, flow proceeds to block 466.

Blocks 466 through 476 represent a timeout procedure to ensure that the gate array is responding to the commands sent from the controller. If the gate array does not respond within a certain time limit (block 468) by returning the requisite acknowledgement or status report, the associated timer is cleared and an error flag is set (block 472) for appropriate action during the main flow chart (block 412 of FIG. 12a). If the gate array responds within the time limit, flow proceeds from block 468 to block 474 where the timer counter is incremented for the next pass through block 468. Before exiting the routine at block 478, any restoration of system registers occurs at block 476.

FIG. 12d illustrates a more detailed perspective of a preferred manner of sending the two-byte message from the controller to the gate array. The flow chart begins at block 479 where the microcomputer determines if the first byte (byte 0) has been sent yet. If not, flow proceeds to blocks 480 where the microcomputer resets a flag indicating that byte 1 has been transmitted, then transmits byte 0, and then sets a flag indicating that byte 0 has been transmitted. If the microcomputer determines that the first byte has been sent, the opposite occurs at blocks 481; the microcomputer resets a flag indicating that byte 0 has been transmitted, then transmits byte 1, and then sets a flag indicating that byte 1 has been transmitted. This subroutine, which may be called from block 412 of FIG. 12a, is exited at block 482.

Figure 13A:
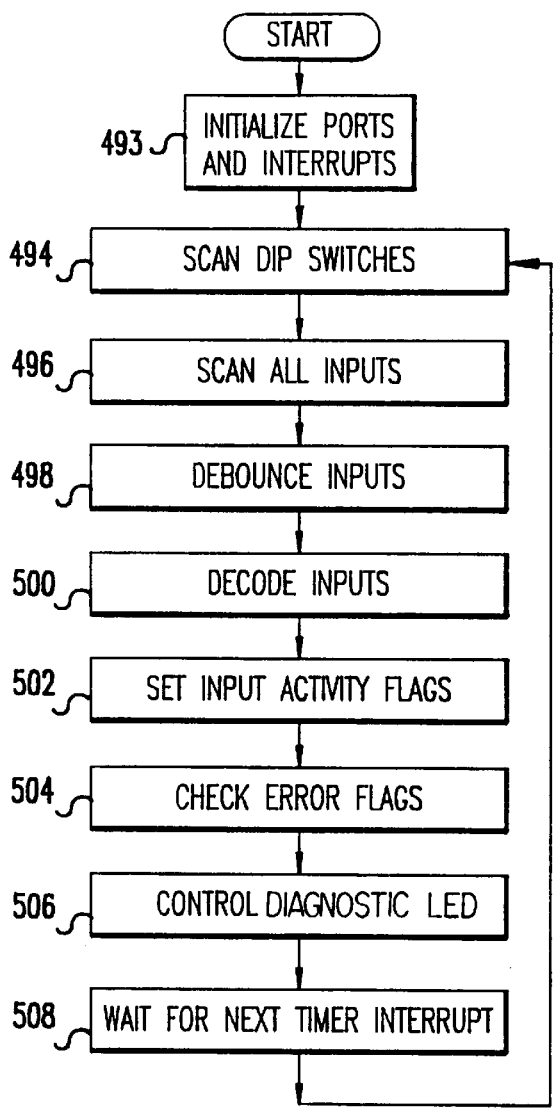

FIGS. 13a–13d respectively illustrate a main routine, a timer interrupt routine, a serial communications interrupt routine, and a serial peripheral interrupt routine as a preferred manner of programming the microcomputer of the termination board 38 (FIG. 11d). FIG. 13a begins at block 493 where the microcomputer is depicted transitioning from the reset to initialization stage. At block 494, the microcomputer scans the trinary DIP switches to determine the configuration set by the operator.

At blocks 496 through 500, the microcomputer scans, debounces and decodes all inputs to determine which tasks must be executed. Activity flags, as depicted at block 502, may be set to record the types of tasks to be performed. Blocks 504 and 506 depict the microcomputer checking for and displaying errors that may have transpired via the scanned inputs. Other tasks may also be processed at this point in response to messages or flags being sent from any of the other routines.

From block 506, flow proceeds to block 508 where the microcomputer waits for the timer interrupt routine to prompt another reading of the DIP switches and other inputs to the microcomputer.

Figure 13B:
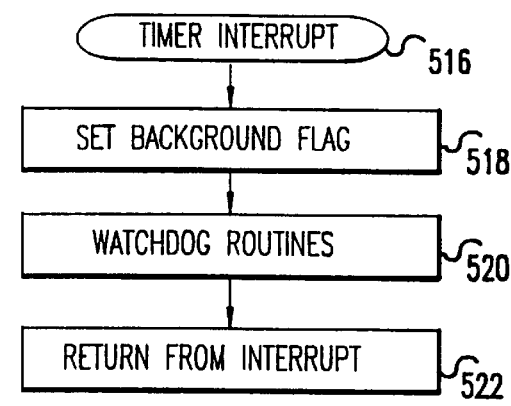

The timer interrupt routine, illustrated in FIG. 13b and beginning at block 516, comprises two basic steps, depicted at blocks 518 and 520. At block 518, the microcomputer sets a background flag to indicate that the time has come to once again scan the DIP switches and other inputs to the microcomputer. Thus, when the microcomputer returns from block 508, it proceeds to block 494.

From block 518, flow proceeds to block 520 where the microcomputer refreshes an internal conventional watchdog timer circuit (e.g., an internal COP register), which protects the microcomputer from entering into nonprogrammed modes. Other watchdog routines may also be implemented at this point to ensure proper operation external to the microcomputer. The interrupt routine is exited via block 522.

Figure 13C:
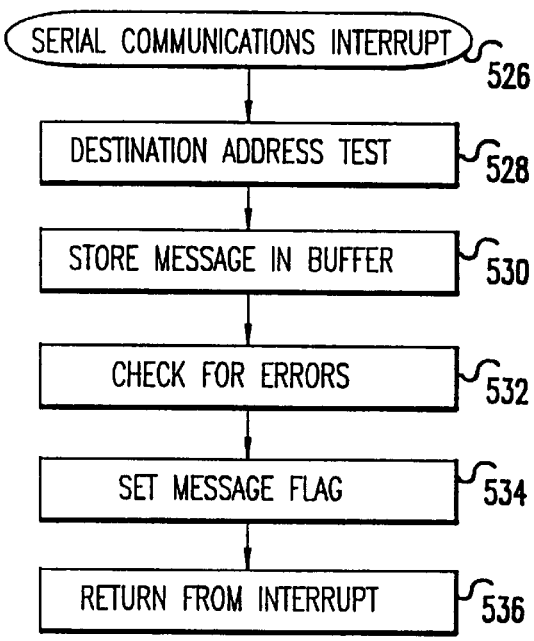

The serial communications interrupt routine, illustrated in FIG. 13c, illustrates a preferred manner for the termination board to communicate with external devices via the network drivers. The routine begins at blocks 526 and 528 where the microcomputer enters the routine and checks the network address to determine if the communication over the network contains the destination address of the subject termination board. At blocks 530, 532 and 534, the microcomputer stores, validates and flags the communication. The message flag set at block 534 may be executed, for example, in the main routine of FIG. 13a or the interrupt routine of FIG. 13d, depending on the particular type of message. The routine is exited at block 536 via a return from interrupt command.

Figure 13D:
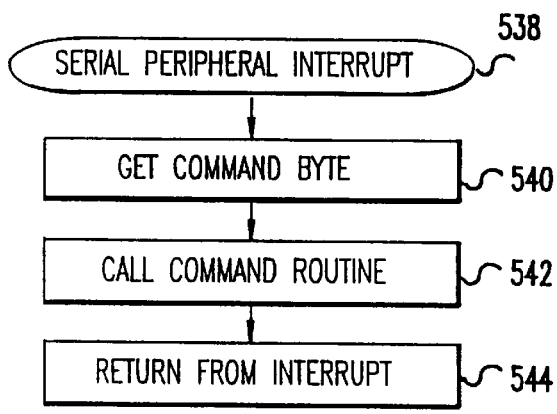

FIG. 13d illustrates a preferred manner for the termination board to communicate with the controller board via the previously discussed master/slave interface. The routine begins at blocks 538 and 540 where the microcomputer enters the routine and retrieves the command being sent from the controller. At block 542, the microcomputer calls the appropriate subroutine for executing the command sent from the controller. For example, the microcomputer may be instructed to send the current status of each of the eight input switches to the controller. In this instance, the microcomputer would call a subroutine which reads the status of each switch and transmits that data to the controller. The routine is exited at block 544 via a return from interrupt command.

While the invention has been particularly shown and described with reference to a few particular embodiments, it will be recognized by those skilled in the art that modifications and changes may be made to the present invention described above without departing from the spirit and scope thereof. For instance, the termination board 38 may be used as one of several types of circuit boards used to interface with various types of outside devices and/or to provide varying levels of control to the circuit breakers.

What is claimed is:

1. For use within a loadcenter in an electrical distribution system used to control current paths through a plurality of associated electrical switching means, a circuit arrangement comprising:

A loadcenter enclosure;

a plurality of electrical switching means, installed in said loadcenter enclosure, each having a plurality of statuses including an open contact status and a closed contact status;

an informational display arranged to display the plurality of statuses at a user access side of the display;

a control circuit coupled to said plurality of electrical switching means and the informational display and installed in said loadcenter enclosure, wherein the control circuit automatically monitors the contact status of the plurality of electrical switching means and drives the informational display so that a display of statuses is provided;

a termination circuit, coupled to the control circuit, for receiving at least one remote control signal that commands at least one of the electrical switching means to change the associated contact status wherein the control circuit is a programmable control circuit, responsive to said at least one remote control signal and to means for correlating said at least one remote control signal to said at least one electrical switching means for controlling the contacts of said at least one electrical switching means wherein the control circuit determines the electrical switching means specified by said at least one remote control signal.

2. A loadcenter arrangement for controlling a plurality of circuit breakers, each of which operates in at least an open and a closed circuit position and each having a plurality of statuses including an open contact status and a closed contact status, the arrangement being in a loadcenter housing and comprising:

a circuit breaker engagement circuit, respectively coupled to the circuit breakers, located in the loadcenter housing and responsive to at least one of a plurality of remote control signals, for controlling the circuit such that at least one circuit breaker is able to open and close in response thereto;

a user-operable programmable control/display circuit, integrally contained within the panelboard housing and situated to generate signals to control the engagement circuit so that said at least one circuit breaker is properly controlled between the open and closed circuit positions, and arranged to display the plurality of statuses at a user access side of the display;

a control circuit, coupled to said plurality of circuit breakers and located in the loadcenter housing and the user-operable programmable control/display circuit, which automatically monitors the contact status of the plurality of circuit breakers and drives the user-operable programmable control/display circuit so that a display of the statuses is provided;

a termination circuit coupled to the control circuit, for receiving said at least one of a plurality of remote control signals, wherein the control circuit is a programmable control circuit, responsive to said at least one remote control signal and to means for correlating said at least one remote control signal to said at least one circuit breaker, for controlling the contacts of said at least one circuit breaker, wherein the control circuit determines said at least one circuit breaker specified by said at least one remote control signal.

\* \* \* \* \*